United States Patent [19]

Dannatt et al.

[11] Patent Number: 4,922,085

[45] Date of Patent: May 1, 1990

[54] MAILING MACHINE TAPE MODULE AND TAPE DRIVE THEREOF

[75] Inventors: Hugh St. L. Dannatt, Bethel; Carl A. Miller, Fairfield, both of Conn.

[73] Assignee: Pitney Bowes Inc., Stamford, Conn.

[21] Appl. No.: 291,469

[22] Filed: Dec. 28, 1988

[51] Int. Cl.$^5$ ........................... B41J 3/20; G06F 1/00

[52] U.S. Cl. .................................. 235/101; 235/58 P; 101/92; 226/137; 242/58; 242/181

[58] Field of Search .................... 235/58 P, 60 P, 101; 226/136, 137, 141; 242/67.1 R, 58, 180, 181, 196; 101/92, 95

[56] References Cited

U.S. PATENT DOCUMENTS

| | | | |
|---|---|---|---|
| 1,972,851 | 9/1934 | McCarthy . | |
| 2,107,603 | 2/1938 | Ellenburg . | |
| 2,177,727 | 10/1939 | Krakaur . | |
| 2,970,536 | 2/1961 | Bach | 101/227 |
| 3,401,630 | 9/1968 | Goodrich, Jr. | 101/218 |
| 3,556,001 | 1/1971 | Kinney et al. | 101/92 |
| 3,660,203 | 5/1972 | Beck et al. | 156/384 |
| 3,712,527 | 1/1973 | Luperti et al. | 226/136 |
| 3,784,073 | 1/1974 | Faggetter | 216/47 |
| 3,791,293 | 2/1974 | Rastorguyeff et al. | 101/234 |
| 3,867,861 | 2/1975 | Hamisch, Sr. | 83/571 |
| 3,878,777 | 4/1975 | Clary | 101/93.28 |
| 4,007,681 | 2/1977 | Swaniger | 101/288 |
| 4,018,153 | 4/1977 | Freeman | 101/93 |
| 4,082,595 | 4/1978 | Slater | 156/351 |
| 4,519,866 | 5/1985 | Hoffmann | 156/353 |
| 4,671,153 | 6/1987 | Peyre | 83/203 |
| 4,763,823 | 8/1988 | Eder et al. | 242/58 X |

OTHER PUBLICATIONS

Pitney Bowes Four Page Brochure for Model 5712 Register and 5840 Tape Stamp Machine (PB Form 8822 5–71).

*Primary Examiner*—Benjamin R. Fuller

*Attorney, Agent, or Firm*—Charles G. Parks, Jr.; David E. Pitchenik; Melvin J. Scolnick

[57] ABSTRACT

A tape advancing system for advancing a tape past a printing device in a mailing machine selective draws one of two tapes, from a supply reeled and presents the selected tape for postage indicia printing. The tape system includes, a first motor for selectively advancing a first one of a plurality of tapes and a second motor for moving the selected tape to a printing position. The tapes are advanced past the printing device in a parallel, facing relationship. The selected tape is exposed for imprinting by the printing device. The tape is moved into a printing position only when it is desired to imprint tape. At other times, the tapes are clear of printing device thereby permitting the printing device to imprint envelopes delivered by an envelope transport.

20 Claims, 20 Drawing Sheets

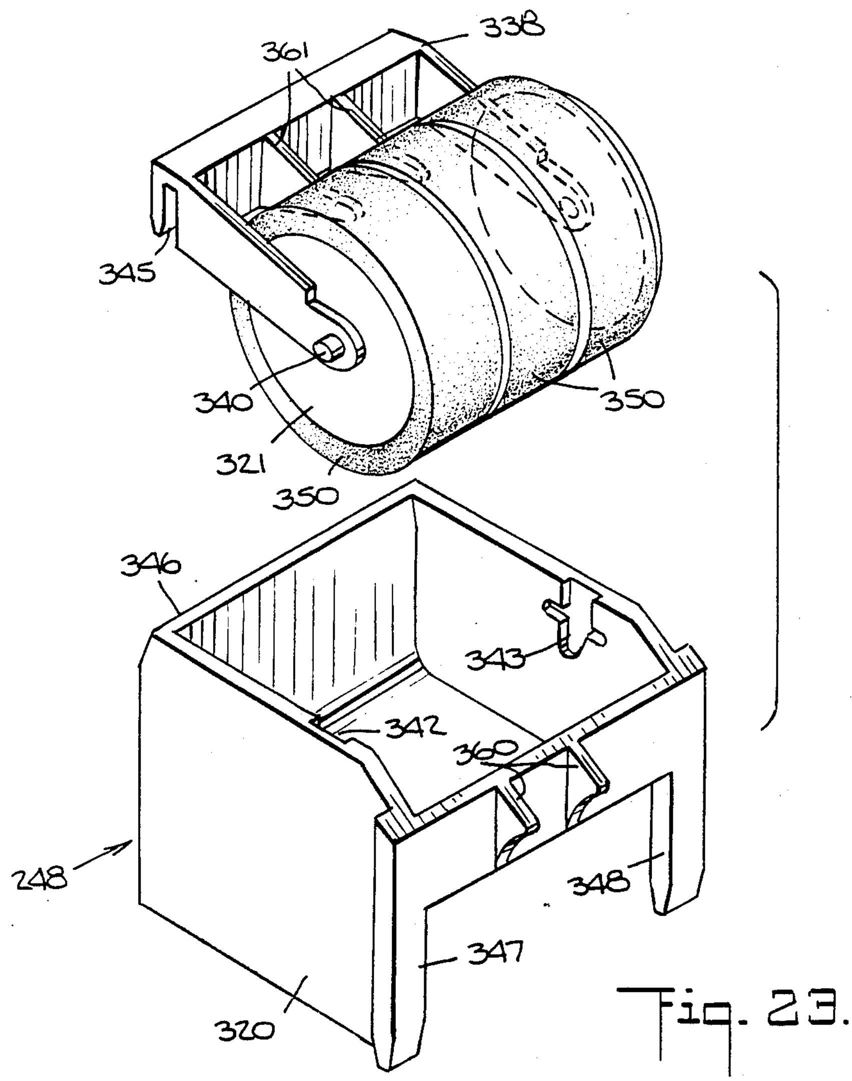
Fig. 23.
Fig. 22.
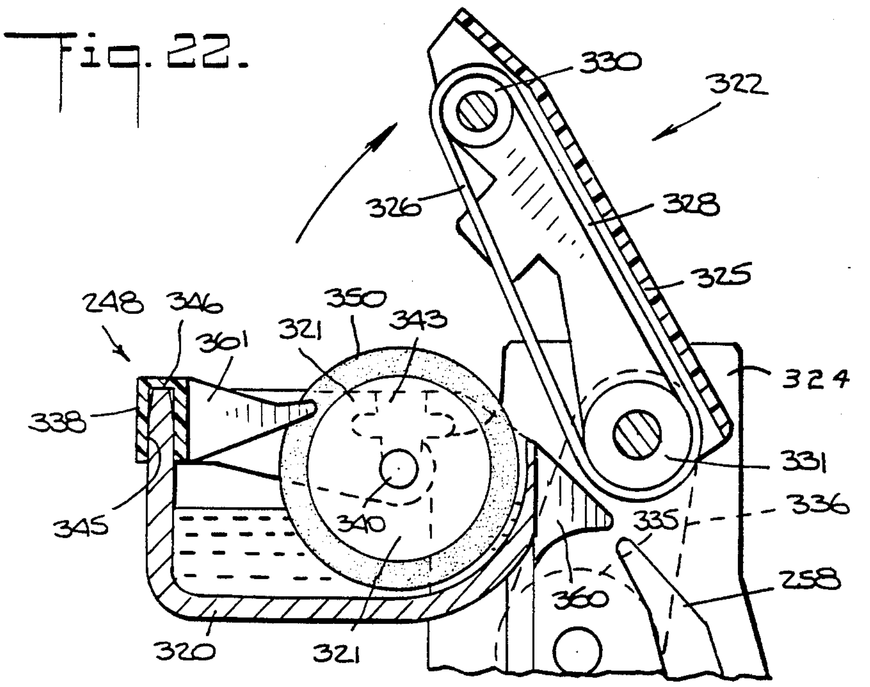

MAILING MACHINE TAPE MODULE AND TAPE DRIVE THEREOF

BACKGROUND OF THE INVENTION

The invention disclosed herein relates generally to tape handling apparatus, particularly tape advancing systems and components thereof, and more particularly to systems and components thereof for advancing tape past a printing device in a mailing machine. The invention relates further to a tape advancing system which draws at least two tapes, which may be different or the same, from a reeled supply thereof and presents one tape at a time for imprinting with postage indicia or the like.

It is desirable for a mailing machine to process different sizes and types of mail quickly and efficiently. It is also desirable for a mailing machine to imprint postage and like indicia either directly on the mail piece or on a tape strip which is thereafter affixed to a mail piece that may be too large or too irregularly shaped to imprint postage indicia directly thereon. Moreover, for high-speed operation, it is desirable that the mailing machine selectively imprint either the mail piece or a tape without shutting down the machine to changeover from imprinting mail pieces to tape and vice versa. It is also desirable for a mailing machine to imprint different types of tape, for example, a tape having a water-activate adhesive and a tape having a pressure-sensitive adhesive.

U.S. Pat. No. 4,852,786, discloses a dual tape drive system which utilizes separate motors to advance each of two tapes. Another motor is used to move a track on which the tapes are advanced between a home position and a printing position. The tape module disclosed herein includes a tape drive system which is an improvement over the one disclosed in U.S. Pat. No. 4,852,786.

SUMMARY OF THE INVENTION

It is an object of the present invention to provide an improved tape drive system for advancing a plurality of tapes.

It is another object of the present invention to provide an improved drive system for advancing a plurality of tapes which reduces the number of motors used to advance the tapes.

It is another object of the present invention to provide an improved tape drive system for advancing a plurality of tapes which selectively advances at least two of the tapes with the same motor.

It is another object of the present invention to provide an improved tape drive system which selects the tape to be advanced utilizing a non-dedicated motor.

It is another object of the present invention to provide an improved tape drive system which includes motors that perform a plurality of functions to thereby reduce the number of motors, solenoids, etc., otherwise required.

It is another object of the present invention to provide improved gear mechanisms, transmission mechanisms and the like, particularly for a tape drive system.

It is another object of the present invention to reduce the number of motors required to perform a given number of functions.

The invention disclosed herein achieves the above and other objects by causing a motor to perform a plurality of functions. In a specific embodiment, a tape drive system is provided for selectively advancing a plurality of tapes into and out of a printing position which includes at a least motor which performs at least two functions. In one embodiment, the system includes a first motor and means driven by the first motor for selectively advancing one tape at a time. The advancing means in one embodiment is configured to advance a selected tape by the action of a second motor which is available to perform still another function, for example, moving a tape into and out of a printing position. In that embodiment, the motor action used to select a tape is a reversal in the direction of rotation of the second motor. Thus, when the direction of rotation of the second motor is changed, the configuration of the advancing means is changed so that another tape is advanced.

A tape drive system in accordance with the invention is provided, particularly for use in a postage meter. The tape drive system selectively advances a plurality of tapes past a printing device for imprinting. A single drive motor is used to advance the tapes. The tapes are advanced by the printing device in a parallel, facing relationship. A selected tape is exposed for imprinting by the printing device. In order to permit the same printing device to imprint on items other than the tape, the tape is moved into a printing position only when it is desired to imprint tape. At other times, the tapes are clear of the printing device thereby permitting the printing device to imprint items such as envelopes. When in the printing position, the tape and the printing device are relatively moved closer to each other to imprint the exposed of the facing tapes. The tape system in delivering tape to the printing device moves the tapes in two directions.

In a specific embodiment, the tape drive system comprises the first drive motor and the advancing means comprises first and second drive rollers. The first roller receives a first tape and advances it upon rotation of the first roller, and the second roller receives a second tape and advances it upon rotation of the second roller. The advances means includes means coupling the first drive motor to rotate either the first drive roller or the second roller.

The tape drive system includes guiding structure receiving the first tape advanced by the first roller and the second tape advanced by the second roller and guiding the first and second tapes into a parallel, facing and contacting relationship with other. The tape drive system further includes a tape track having a generally planar tape track surface and means for guiding tape therealong, the tape track being disposed to receive the first and the second tapes from the guiding structure and guiding the first and second tapes along the planar surface in the parallel, facing and contacting relationship.

The tape drive system includes a first frame supporting the first and second rollers, the guiding structure and the tape track. First means mount the first frame to a second frame for movement in the two orthogonal directions relative to the second frame. In a specific embodiment, the first mounting means comprises a parallelogram linkage connecting the first and second frames and enabling relative movement between the first and second frames in one of the orthogonal directions.

The first drive motor is mounted in the second frame and has a drive shaft. The first coupling means comprises a split shaft coupling which couples first and second parts of the drive shaft so that the second drive shaft part may be moved axially and parallel to one of the orthogonal directions relative to the first shaft part. The first and the second drive rollers are movable with the second shaft part, enabling relative movement between the first and second frames along the one orthogonal direction.

The tape drive system includes the second drive motor which is mounted in the second frame. The second drive motor moves the first frame and causes the first coupling means to couple one of the drive rollers to the first motor. The second drive motor is bidirectional and has a drive shaft which the second motor rotates in opposite directions. The first coupling means is coupled to the second drive motor shaft and changes coupling of the first drive motor from one drive roller to the other when the second drive motor changes the direction of rotation of its drive shaft.

A second coupling means is provided coupling the second motor to the first frame. The second coupling means includes a lead screw having a bidirectional screw thread having first and second ends. The lead screw being coupled to the second drive motor drive shaft to rotate therewith, and a lead screw follower is coupled to the bidirectional lead screw to advance (a) along the lead screw thread in one direction from the first thread end to the second thread end upon rotation of the lead screw in either direction, and then (b) along the lead screw in a direction opposite to the one direction from the second thread end to the first thread end upon further rotation of the lead screw in either direction. The lead screw follower is coupled to the second frame and advances the second frame therewith relative to the lead screw.

The lead screw follower includes an axially split collar to facilitate assembly and disassembly of the lead screw and the second coupling means.

In accordance with one embodiment of the invention, a postage meter is provided including a printing device and a tape drive system for selectively advancing first and second tapes for imprinting by the printing device. The tape drive system comprises: a first drive motor for advancing the first and the second tapes; a first roller adapted to receive the first tape and advance it upon rotation of the first roller; a second roller adapted to receive the second tape and advance it upon rotation of the second roller; means guiding the first and the second tapes in a parallel, facing relationship by the printing device; first coupling means coupling the first drive motor to selectively rotate the first and second rollers and thereby selectively advance one of the tapes relative to the printing device; and means causing an exposed one of the first and the second tapes to be imprinted by the printing device.

In accordance with another embodiment, the tape drive system for the postage meter comprises: a first frame; a second frame; and first means mounting the first frame to the second frame for movement in two orthogonal directions relative to the second frame and the printing device. The first drive motor is mounted to the first frame for advancing the first and the second tapes by the printing device. The first coupling means are mounted in the first frame for coupling the first drive motor to selectively advance the first and second tapes. The second drive motor is mounted in the first frame and the second coupling means couples the second motor to the second frame for moving the second frame in a first of the orthogonal directions to a printing position with the tapes adjacent the printing device. Means moving the second frame in a second of the orthogonal directions to move an exposed one of the tapes closer to the printing device for imprinting thereon by the printing device.

BRIEF DESCRIPTION OF THE DRAWINGS

The invention is illustrated by way of example and not limitation in the figures of the accompanying drawings in which like references denote the same elements, and in which:

FIG. 22 is a side sectional view of the moistener device with the guide conveyer thereof in its open, service position;

FIG. 23 is an exploded perspective view of the moistener device;

DESCRIPTION OF THE PREFERRED EMBODIMENTS

Figure 1:
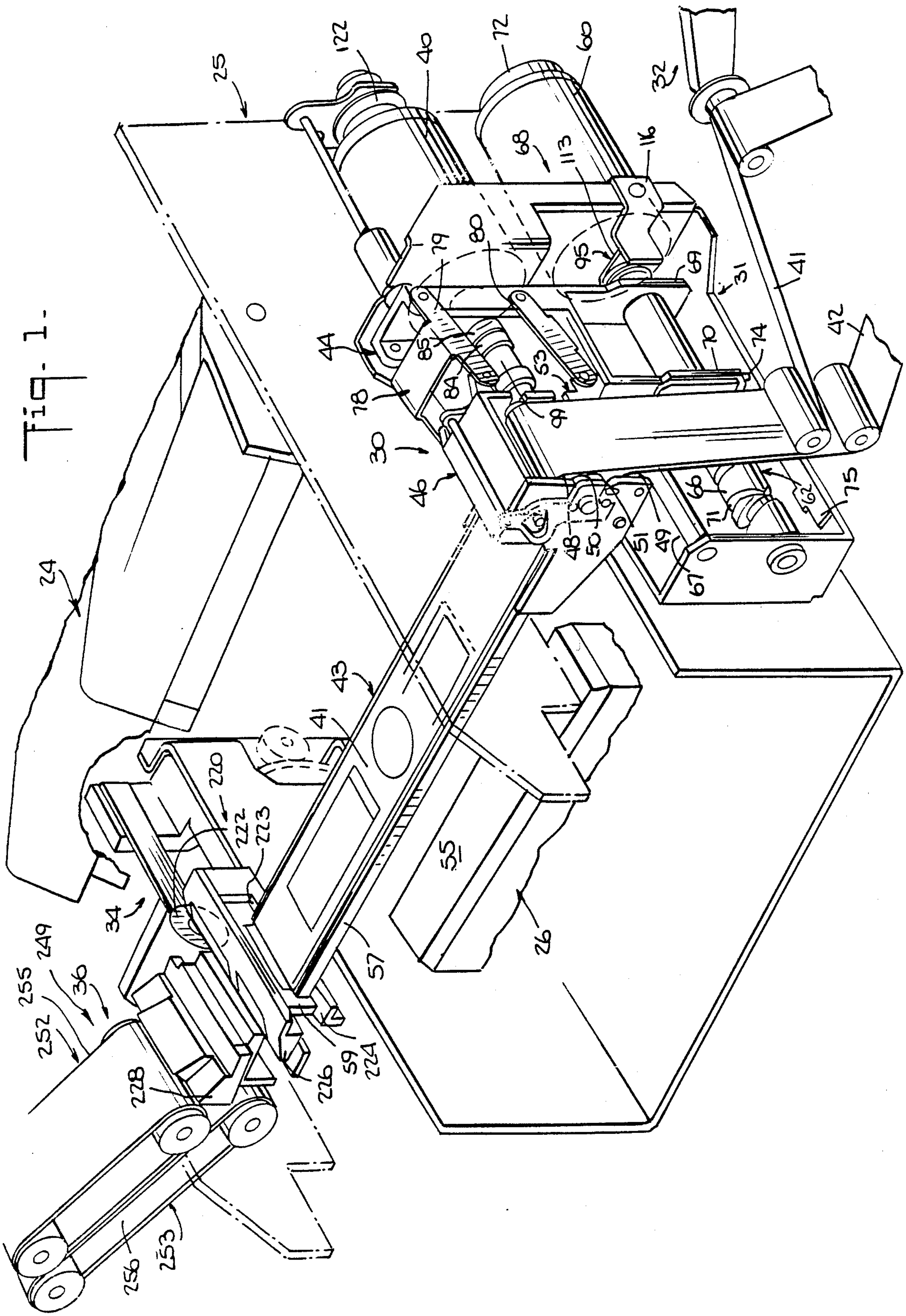
FIG. 1 is a perspective view of portions of a tape module according to the present invention for a mailing machine.

Referring to FIG. 1, among the subsystem modules which may be incorporated into a modular mailing machine of the type disclosed in patent applications referenced above are postage meter module 24, tape module 25, and platen module 26. Tape module 25 includes tape drive subsystem 30, tape carriage moving subsystem 31, tape reel subsystem 32 (partially shown in FIG. 1), tape cutting subsystem 34 and tape take-away and moistening subsystem 36 (partially shown in FIG. 1). Tape drive subsystem 30 (FIGS. 2-8) includes first drive motor 40 for selectively advancing tapes 41 and 42 towards a cantilevered track 43 on which the respective tape is imprinted with indicia by postage meter module 24. Tapes 41 and 42 may be different so as to provide versatility or they may be identical which doubles the amount of tape which may be dispensed by tape module 25 before resupply is necessary. For example, tape 41 may be a pre-glued (mucilagecoated) tape which is moistened by subsystem 36, while tape 42 may be a laminated pressure sensitive tape which does not require moistening. After imprinting, the imprinted tape segment is severed by tape cutting subsystem 34 and supplied to tape take-away and moistening subsystem 36 for moistening, where appropriate, and ejecting it from tape module 25.

Tape reel subsystem 32 (FIGS. 9-13) includes structure for holding two supply reels from which tapes 41 and 42 are drawn, and feed structure for supplying the tapes to tape drive subsystem 30. Tape reel subsystem 32 also includes structure for tensioning tapes 41 and 42 as they are withdrawn by tape drive subsystem 30, and includes structure which retracts into tape reel subsystem 32 a portion of tape supplied to tape drive subsystem 30 that is not cut by cutting subsystem 34. Although it is preferred that the tape reel subsystem utilized with tape drive subsystem 30 be embodied by the one disclosed herein, other tape reel systems may be used as well.

Tape cutting subsystem 34 (FIGS. 14-17) severs tape 41 or 42 after imprinting by postage meter module 24 and includes structure for holding a tape as it is being cut. Although it is preferred that the tape cutting subsystem utilized with tape drive subsystem 30 be embodied by the one disclosed herein, other tape cutting subsystems may be used as well.

Tape take off and moistening subsystem 36 (FIGS. 18-25) includes structure capable of directing cut segments of tapes 41 and 42 along different paths, one path for moistening cut segments of either or both of tapes 41 and 42, and another path which bypasses a moistening device in subsystem 36. Tape take off and moistening subsystem 36 further includes structure for directing cut segments of tapes to the exit of tape module 25 from which the tape segments may be applied to envelopes, labels, etc. Although it is preferred that the tape take-away and moistening subsystem utilized with tape drive subsystem be embodied by the one disclosed herein, other tape take-away and moistening subsystems may be used as well.

Referring to FIG. 1, tape track 43 is supported in cantilever fashion by a movable tape carriage 44 which also supports tape advancing means 46 comprising drive rollers 48, 49 (FIG. 2) and idler rollers 50, 51 for selectively advancing either tape 41 or tape 42 along track 43. Tape 41 is fed into the nip of drive roller 48 and idler roller 50 and tape 42 is fed into the nip of drive roller 49 and idler roller 51. As described below, first coupling means 53 (FIGS. 3-6) selectively couples tape drive motor 40 to drive either drive roller 48 or drive roller 49 to selectively advance tape 41 or tape 42 to track 43.

Postage meter module 24 (FIG. 1) includes a printing matrix (not shown) which imprints indicia either on an exposed tape 41 or 42 on track 43 or on envelopes depending on the position of tape track 43. Un-imprinted tapes 41 and 42 from tape reel system 32 are fed into tape advancing means 46 Which is pivotally coupled to and supported by tape carriage 44 for vertical movement relative thereto. Track 43 includes guide structure at its edges for guiding tapes 41 and 42 in two layers along tape track 43, such that each may individually be selectively advanced or retracted. One or the other tape may therefore extend under at least a portion of the indicia printing matrix in postage meter module 24 when track 43 is moved thereunder in response to a demand for a imprinted tape. Platen module 26 includes platen 55 which is raised vertically during printing to impact either the exposed tape or an envelope against the printing matrix. As depicted in FIG. 1, postage meter module 24 is in a service position pivoted away from platen module 26. Platen 55 is aligned with the line of flow of mail through postage meter module 24, and in use, postage meter module 24, which may be of the flat bed mailing type, is normally horizontally situated above platen 55, with the printing matrix, not shown, directly above and vertically registered with platen 55. In the home position of tape track 43 depicted in FIG. 3, front edge 57 of tape track 43 is behind platen 55 and behind the line of mail flow which is above and along platen 55. With track 43 in its home position, envelopes moved in the line of mail flow through postage meter 24 are imprinted upon an imprinting demand. In the printing position, tape carriage 44 is moved forwardly to position tape track 43 above platen 55 and the exposed tape thereon is imprinted in response to an imprinting demand. The printing matrix (not shown) in postage meter mailing module 24 is inked by an inking module (not shown), and prints postage and/or other indicia on an exposed tape on track 43 which is impacted against the printing matrix.

Figure 2:
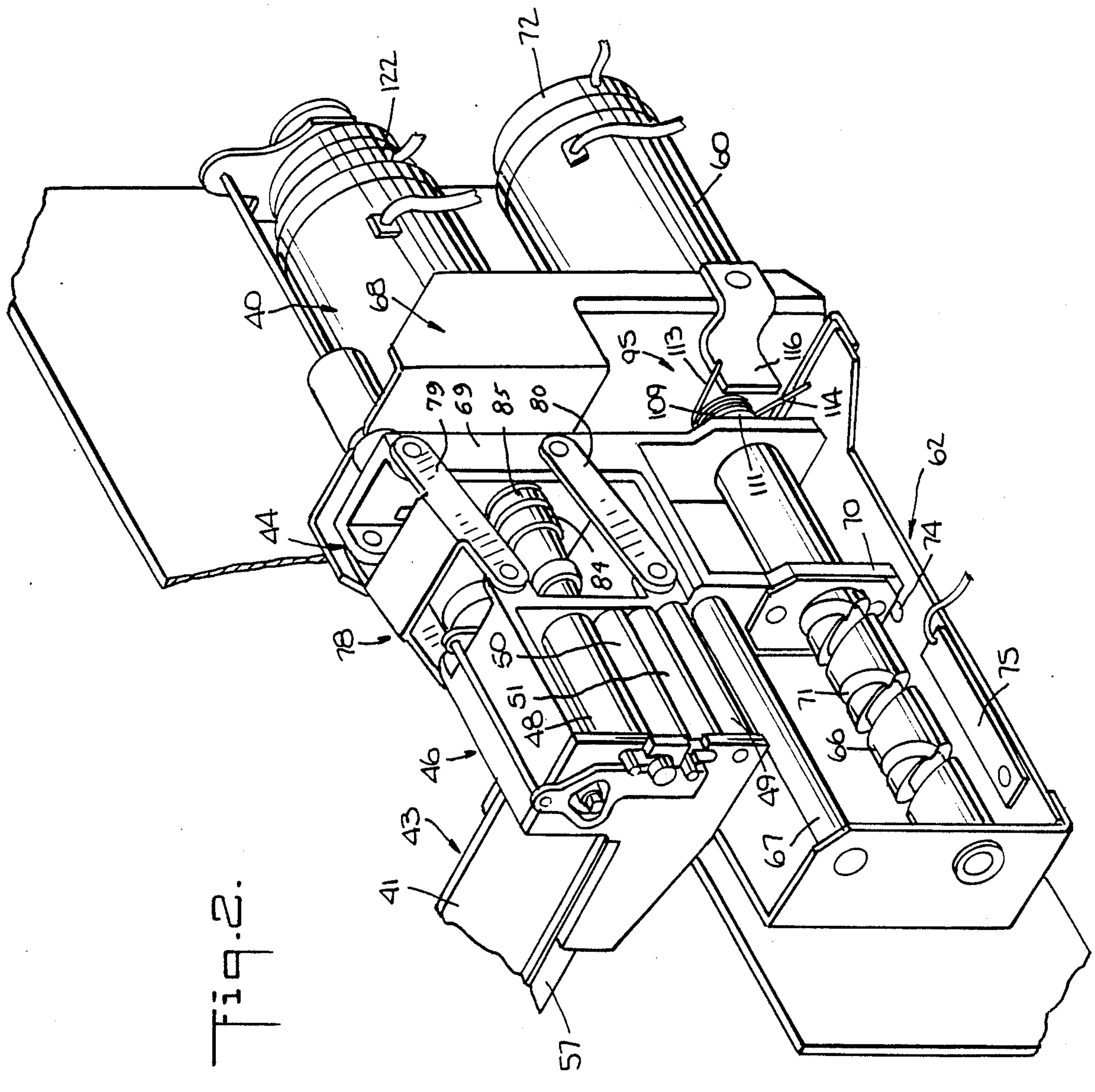
FIG. 2 is a perspective view of the tape drive subsystem of the module of FIG. 1.
Figure 3:
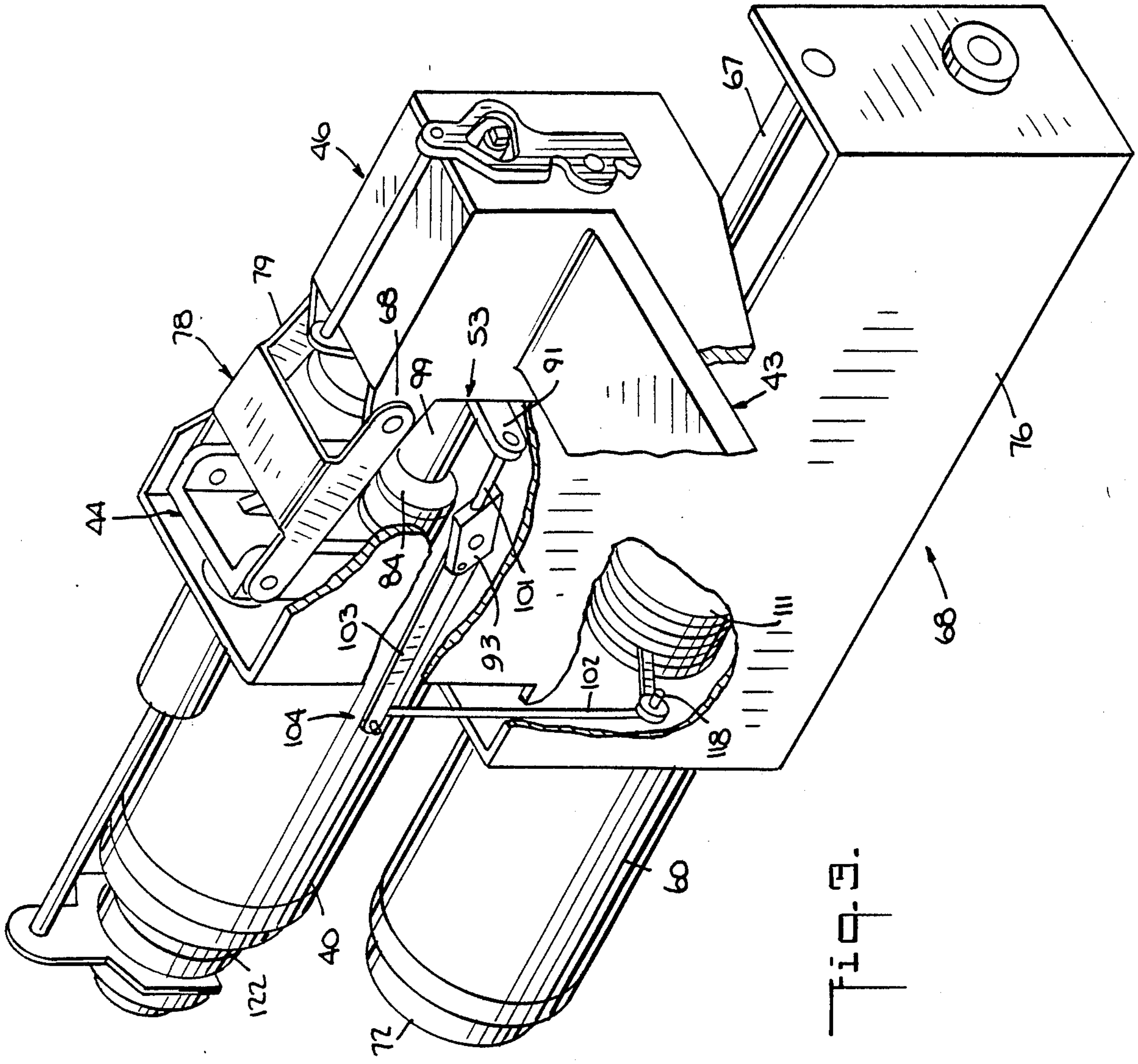
FIG. 3 is a perspective view, partially broken away, of the drive mechanism portion depicted in FIG. 2 but from the opposite side.
Figure 4:
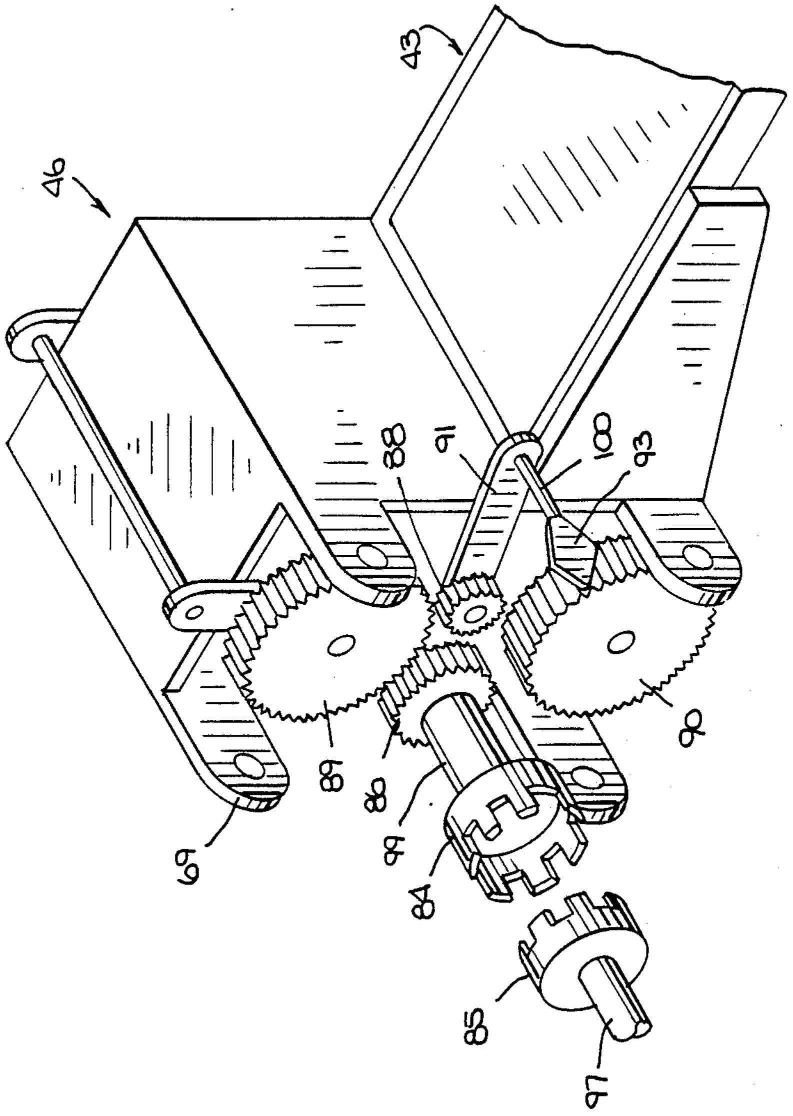
FIG. 4 is a perspective view of the gearing and lead screw parts of the drive mechanism portion of the tape drive subsystem of FIG. 2 depicted in an enlarged scale as compared to that of FIG. 2.
Figure 5:
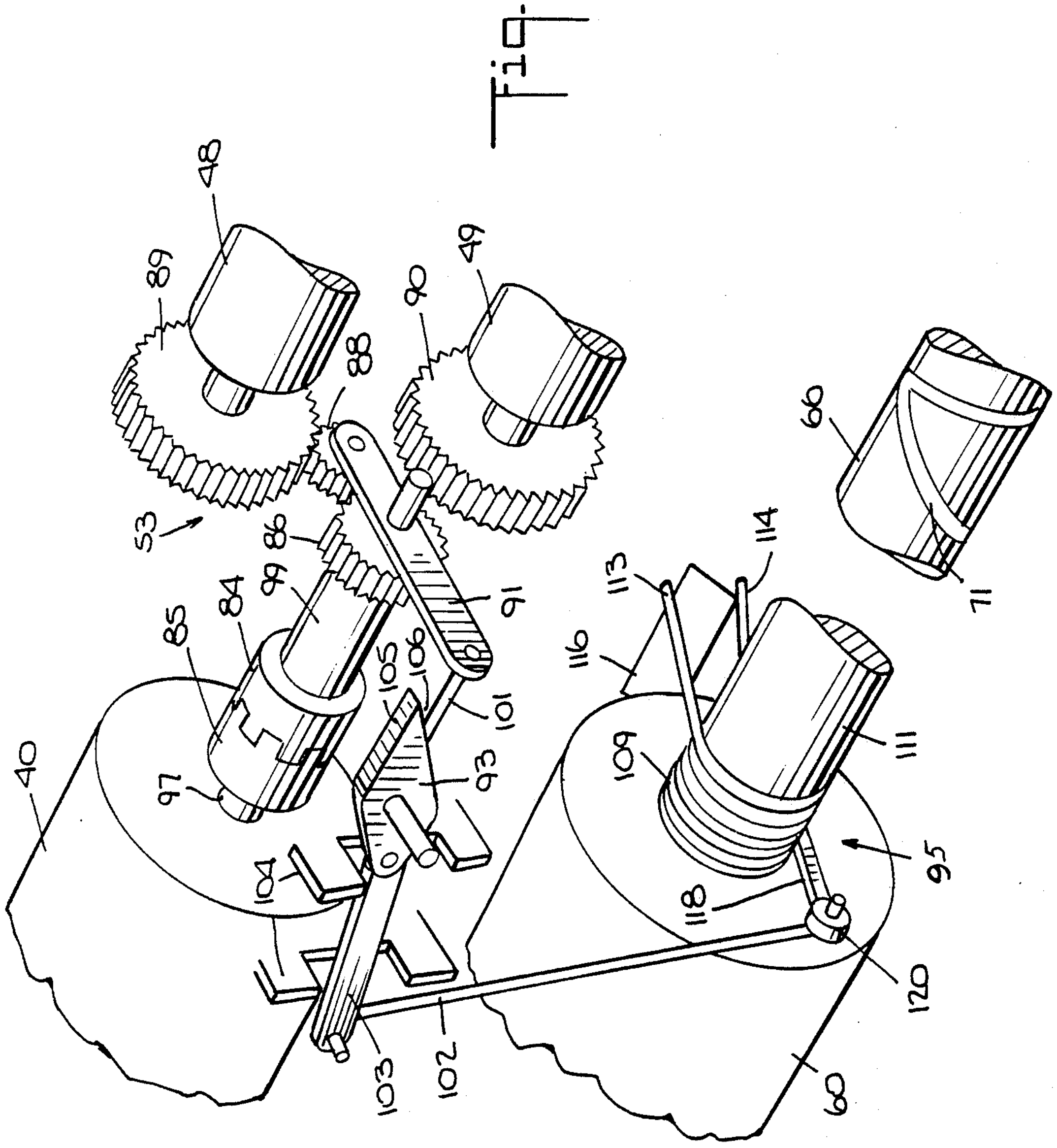
FIG. 5 is a perspective view of the tape selection part of the tape drive subsystem of FIG. 2, in an enlarged scale as compared to that of FIG. 2, and in its condition which selects the upper tape.
Figure 6:
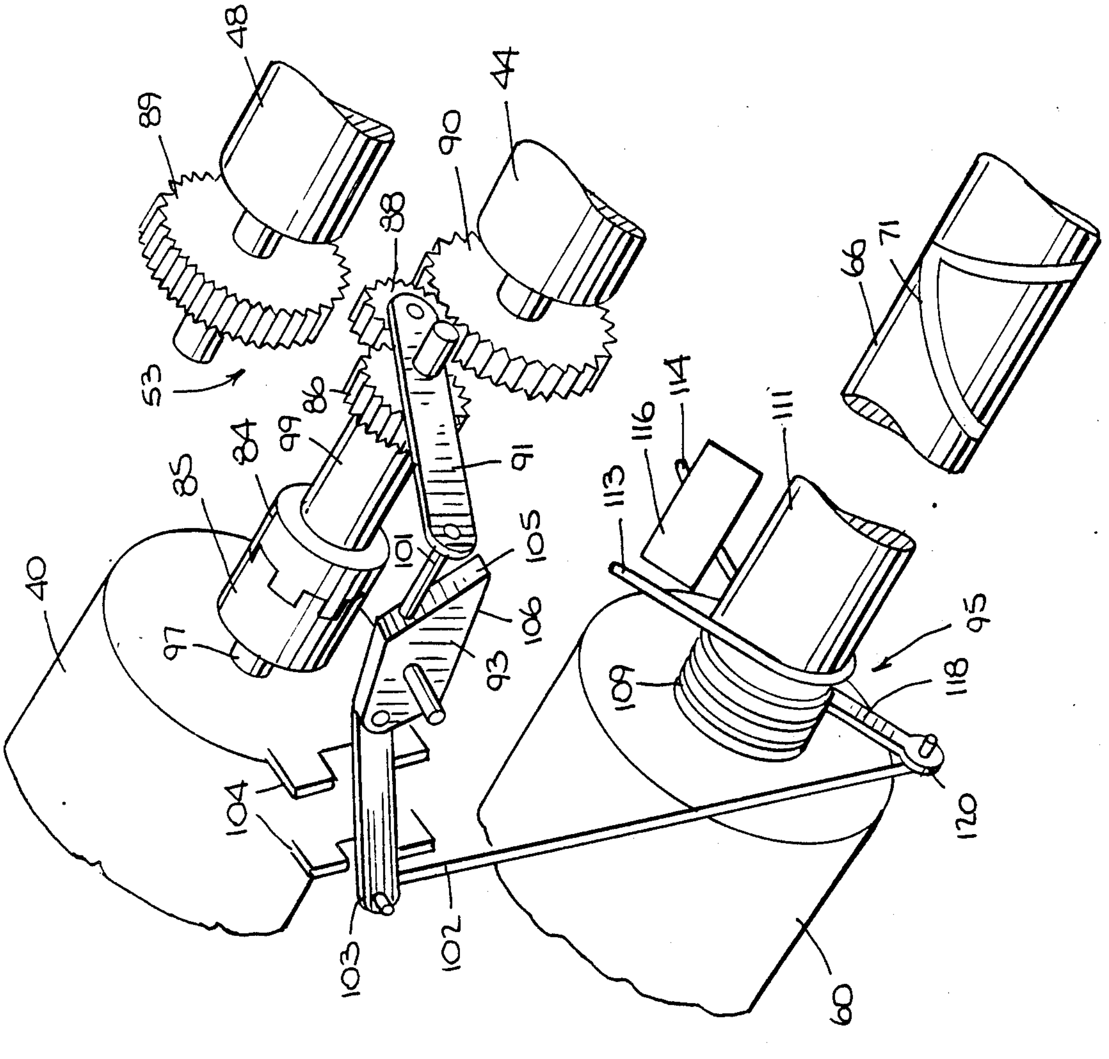
FIG. 6 is a perspective view of the tape selection part depicted in FIG. 5 in its condition which selects the lower tape.

Tape carriage 44 is moved by tape carriage moving subsystem 31 when there is a demand for imprinting tape. Tape carriage moving subsystem includes tape carriage drive motor 60 and second coupling means which moves track 43 into a printing position adjacent platen module 26 and back to the home position shown in FIG. 1. Second coupling means 62 comprises a lead screw arrangement coupling carriage 44 to tape carriage drive motor 60 for forward and backward movement between the rest and printing positions referred to above. The lead screw coupling arrangement 62 includes bidirectional lead screw 66 and associated mounting structure. Referring to FIG. 2, carriage 44 is supported on lead screw 66 and guide rod 67 by bracket 68 for movement along lead screw 66 and guide rod 67. Carriage 44 includes a pawl 70 functioning as a helix follower which is nested in helical grooves 71 of lead screw 66 and is constrained to move, taking carriage 44 with it, along lead screw 66 in a forward (left in FIG. 2) direction from the home position to the printing position (not shown) above platen 55 and in a backward direction back to the home position.

The design of the helical grooves 71 enables pawl 70 to move forward and backward along lead screw 66 regardless of the direction of rotation of the lead screw. Lead screw 66 and helical grooves 71 are fabricated to provide a given back and forth horizontal movement of carriage 44 for a given rotation of lead screw 66 in either direction. The excursion of carriage 44 is precisely determined to insure proper registration of a tape and the printing head in postage meter module 24. A shaft encoder 72 measures the angular position of lead screw 66. For example, with a shaft encoder subdividing a complete revolution of lead screw 66 into 1024 increments, and a lead screw/helical groove arrangement which requires 4.5 lead screw revolutions to advance carriage 44 and track 43 the desired distance from the home to the printing position and back again, 9216 increments of shaft encoder are required, which can precisely be detected by control circuitry including means for accumulating encoder counts.

In addition the maximum forward excursion of carriage 44 may be set by magnet 74 attached to pawl 70 and the position of a Hall sensing device 75 attached to the base of bracket 68 supporting lead screw 66. Thus, when the Hall device 75 detects the presence of magnet 74, rotation of the lead screw 66 is stopped to halt forward excursion of carriage 44, and the accumulated encoder count is noted. To commence rearward excursion of carriage 44 back to the home position, lead screw 66 is again rotated in either direction and the encoder counts again accumulated. As mentioned above, it does not matter which direction lead screw 66 is rotated. Thus, it may be rotated in one direction to forwardly advance the carriage and either in the same or opposite direction to rearwardly retract the carriage, and vice versa. For retraction, when the same encoder count is accumulated as in the forward direction excursion, that count is taken as indicative of the carriage having reached the home position and rotation of lead screw 66 is again stopped. Conventional electronic circuitry to accomplish the foregoing may be utilized.

A parallelogram or four-bar linkage 78 is provided to suspend tape advance mechanism 46 and track 43 and to stabilize and guide track 43 for parallel vertical movement relative to carriage 44 towards postage meter module 24 during tape imprinting, and back again after imprinting. Parallelogram linkage 78 includes carriage 44, and links 79 and 80 pivotally coupled to carriage 44 and tape advance mechanism 46.

Tape module 25 operates as follows. With a segment of a desired tape 41 or 42 exposed on track 43, lead screw 66 is rotated to position track 43 in the printing position above platen 55. An actuator mechanism (not shown) cause platen 55 to rise and urge track 43, as guided by parallelogram linkage 78, towards the printing matrix in postage meter module 24, which if suitably inked will imprint indicia upon the selected tape. Tape track 43 therefore functions as an auxiliary platen to platen 55 during printing. Tape carriage drive motor 60 is then energized to complete the rotation of bidirectional lead screw 66 and return track 43 back to its home position behind platen 55. FIG. 1 shows an imprinted tape still residing on track 43. After track 43 has been returned to its home position, tape drive motor 40 advances the exposed tape so as to advance the imprinted segment past the remote end of track 43, where tape cutting subsystem 34 severs the imprinted segment from the remainder of the tape, which is received by tape take-away and moistening sub-system 36 and ejected from the tape module as described below. Tapes 41 and 42 are then retracted and/or advanced in preparation for the next tape imprint demand. If the demand is t imprint lower tape 42, upper tape 41 is retracted by tape drive motor 40 to expose lower tape 42. If upper tape 40 is to be imprinted, it may simply remain in position.

However, since the printing matrix in postage meter module 24 may not imprint the exposed tape starting immediately at the edge of track 43, if the exposed tape were not retracted slightly, a portion of the tape would not be imprinted. This would result in tape wastage and would force the tape to occupy more space on the envelope or label to which it is adhered than it otherwise would. Therefore, the exposed tape remaining on track 43 after the imprinted segment is cut is slightly retracted. Retracting may be accomplished by an active system, activated for example, by tape drive motor 40, or by a passive system associated with tape reel subsystem 32, described below, or a combination of both subsystems.

The first coupling mean 53 for effecting tape selection depicted in FIGS. 3–6 enables a single motor (tape drive motor 40) to drive both tapes 41 and 42. First coupling means 53 includes coupling member halves 84 and 85, driving gear 86, idler gear 88, upper and lower driven gears 89, 90, all driven by tape drive motor 40; and change lever 91, change wedge 93 and a spring arrangement 95 coupled to tape carriage drive motor 60 for effecting a change from driving one tape to the other.

Coupling member half 84 is engaged by mating coupling member half 85 coupled to shaft part 97 of tape drive motor 40. Coupling member half 84 and driving gear 86 are fixed to rotate with shaft portion 99. Driving gear 86 engages via idler gear 88 either upper driven gear 89 for rotating upper roller 48 or lower driven gear 90 for rotating lower roller 49. Idler gear 88 is moved into meshing engagement between gears 86 and 89 or between gears 86 and 90 by lever 91 to which idler gear 88 is rotatably attached. Pin 101 attached to lever 91 projects therefrom to be engaged by wedge 93 to pivot lever 91 up (counterclockwise) or down (clockwise). Wedge 93 is pivotally supported and coupled to spring arrangement 95 via rocker lever 103 pivotally mounted in notch 104 and push-pull rod 105. Wedge 93 has inclined upper and lower surfaces 105, 106 which coact with pin 101 to cam lever 91 up and down. When lever 91 is cammed to its upper position depicted in FIG. 5, it meshes idler gear 88 between driving gear 86 and upper driven gear 89; and when cammed into its lower position depicted in FIG. 6, lever 91 meshes idler gear 88 between driving gear 86 and lower driven gear 90.

Spring arrangement 95 (FIG. 5) includes a dual coil spring 109 mounted on arbor 111 adjacent tape carriage drive motor 60. Coil spring 109 includes circumferentially spaced tang ends 113, 114 which project adjacent opposed sides of interceptor element 116. Tang ends 113, 114 are spaced so that only one tang end engages interceptor element 116 at a time. Arbor 111 is mounted on lead screw 66 to rotate therewith. As arbor 111 rotates in either direction, one or the other of tang ends 113, 114 engages interceptor element 116 which causes spring 109 to unwind and permits arbor 111 to rotate with a much reduced frictional torque, which is a property of wrap spring clutch devices, so that arbor 111 rotates a fraction of a revolution for each revolution of lead screW 66. Coil spring 109 further includes dual center tangs 118 which engage pin 120 attached to push-pull rod 102 and move rod 102 up and down in accordance with the direction of rotation of lead screw 66. Thus, rotation of lead screw 66 in one direction causes upper driven gear 89 for upper roller 48 and upper tape 40 to be engaged and driven, and rotation of lead screw in 66 the opposite direction causes lower driven gear 90 for lower roller 49 and lower tape 42 to be engaged and driven.

Thus, irrespective of the direction that tape carriage drive motor 60 rotates during forward advancement of tape carriage 44 and tape track 43 to the imprinting position therefor, the direction of rotation selected for tape carriage drive motor 60 on the return of tape carriage 44 and track 43 to the home position determines whether the upper 105 or lower surface 106 of wedge 93 engages pin 101 to pivot lever 91, and thus urge idler gear 88 into meshing engagement with either upper driven gear 89 or lower driven gear 90. In order to meter the required length of tape, an incremental shaft encoder 122 (FIG. I) is incorporated into tape drive motor 40.

Figure 8:
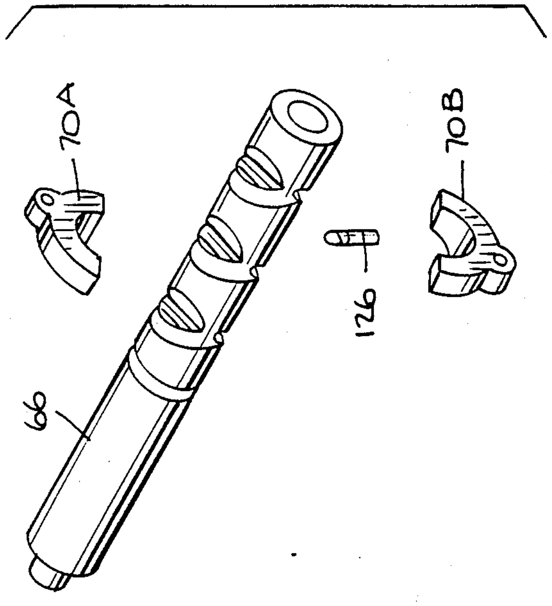
FIG. 8 is an exploded perspective view of the lead screw and part of the support depicted in FIG. 7.
Figure 7:
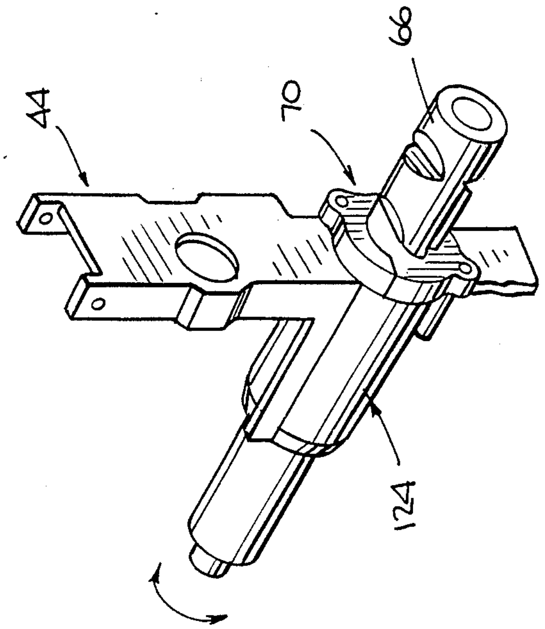
FIG. 7 is a perspective view of the lead screw and its support which are part of the carriage moving mechanism depicted in FIG. 2.

Referring to FIGS. 7 and 8, tape carriage 44 is mounted to lead screw 66 by bearing 124 and pawl 70. For ease of assembly and disassembly, pawl 70 is split and includes pawl halves 70A and 70B, and helix follower 126. Pawl halves 70A, 70B are each fastened to bearing 124 by respective screws.

Referring to FIGS. 9–13 tape reel subsystem 32 includes tape reels 150 and 151 from which tapes 41 and 42, respectively, are withdrawn by tape drive subsystem 30. Reels 150, 151 include hubs 152, 153 which are rotatably supported by spindles 155, 156 secured to frame 157. Tape 41 is fed from reel 150 to tape drive subsystem 30 via idler roller 159, roller 160 carried by tension arm 161 and idler roller 162. Tape 42 is similarly fed from reel 151 to tape drive subsystem 30 via idler roller 164, roller 165 carried by tension arm 166 and idler rollers 167 and 168.

Tension arms 161, 166 are rotatably supported at one end thereof by spindles 155, 156, respectively, and each pivots about the axis of the respective spindle 155, 156 to move its respective roller 160, 165 along respective arcs defined by curved slots 170, 171. Tension arms 161, 166 are urged to rotate in a counterclockwise direction by respective tensioning devices 173 (FIG. 10) and thereby tension respective tapes 41, 42 as they are withdrawn from reels 150, 151 by tape drive subsystem 30. Tension arms 161, 166 function as lever arms in that they divide the tension provided by tensioning devices 173. Tape reels 150, 151 and the respective tensioning devices, tension arms and rollers used in supplying tapes 40 and 41 under tension to tape drive subsystem 30 are the same. Therefore, tape reel 151 and its associated tension arm, tensioning device and rollers are described below in more detail with the understanding that such description applies also to tape reel 150 and its associated tension arm, tensioning device and rollers.

Figure 9:
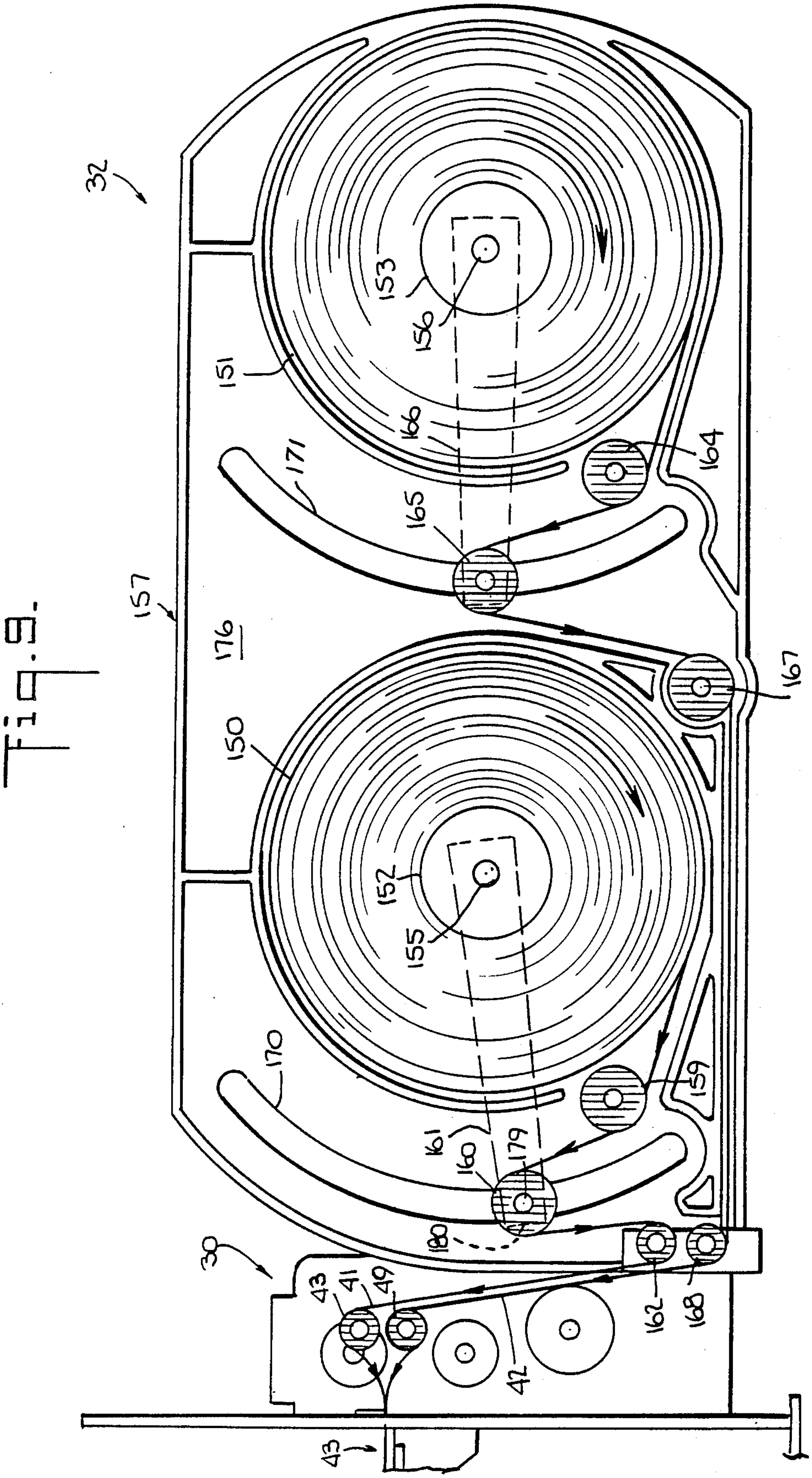
FIG. 9 is a side view of the tape reel subsystem of the tape module depicted in FIG. 1.
Figure 10:
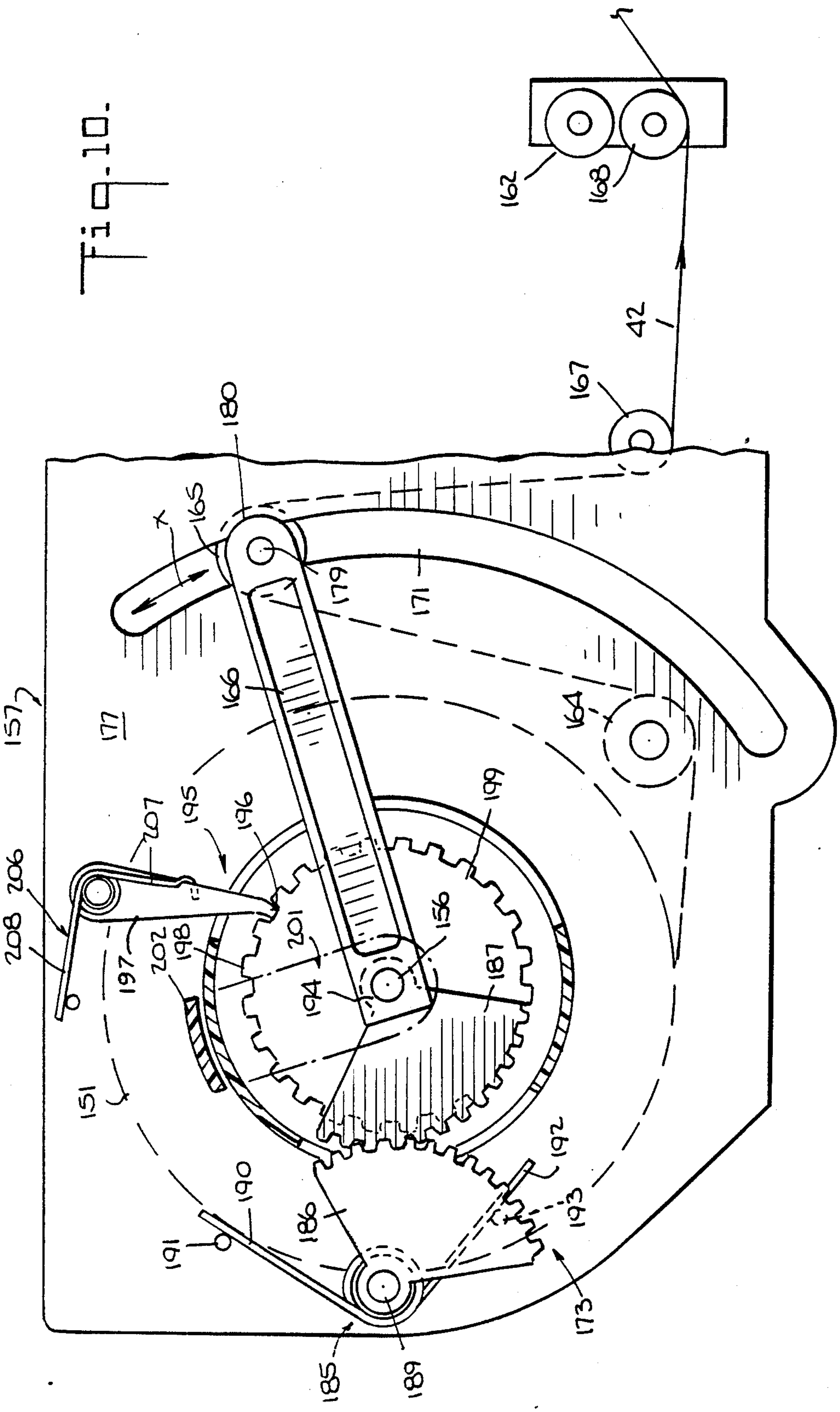
FIG. 10 is a side view of part of the tape reel subsystem depicted in FIG. 9 from the opposite side thereof showing the reel locked against rotation.

Referring to FIGS. 9 and 10, reel 151 is disposed on one side 176 (FIG. 9) of frame 157 and tension arm 166 is disposed on the opposite side 177. Referring to FIG. 10, tension arm 166 carries spindle 179 at its free end 180 which projects through curved slot 171 to frame side 176 (FIG. 9). Spindle 179 rotatably carries roller 165 over which tape 42 is drawn. Tension arm 166 pivots in response to changes in the tension on tape 42 as tape 42 is withdrawn from reel 151 by tape drive subsystem 30. An increase in tension causes tension arm 166 to pivot in a clockwise direction and spindle 179 to move downwardly in slot 171. Tensioning device 173 urges tension arm 166, which functions as a lever dividing the force of tensioning device 173, in a counterclockwise direction with respect to FIG. 10. Tensioning device 173 includes torsion spring 185, gear section 186 and gear section 187. Spring 185 is carried on shaft 189 with one tang 190 engaging pin 191 fixed to frame 157 and its other tang 192 engaging pin 193 fixed to gear section 186. Gear section 187 is fixed to tension arm 166 to pivot therewith about spindle 156. Gear sections 186, 187 include meshing teeth such that pivoting of tension arm 166 causes pivoting of gear section 186 against the action of spring 185. Thus, clockwise pivoting of arm 166 in response to increased tension on tape 42 causes spring 185 to be compressed and to resist pivoting of arm 166. Tension arm 166 is thereby pivoted to take up any slack in tape 42 when there is a decrease in tension on tape 42.

The pivot axis 194 of gear section 187 is not the geometric center of the gear segment. The same is true of gear segment 186 with respect to pivot axis 189. Ideally, gear segments 186 and 187 are a non-circular gear pair. However, for lightly loaded applications with not too extreme a location difference between the geometric and pivotal centers and with limited angular rotation, eccentrically pivoted circular gears can be used. The instantaneous mating radius of gear segment 187 increases as it rotates in a clockwise direction. The corresponding radius of mating gear segment 186 decreases as it is driven in a counterclockwise direction by segment 187. As segment 186 rotates in a counterclockwise direction, torsion spring 185 produces an increasing force against pin 193 as it is wound tighter. The instantaneous radii of gear segments 186 and 187 are designed so that they compensate for the linear increase in torque produced by the counterclockwise winding of torsion spring 185 about pivot 189. This results in a constant torque applied to tension arm 166 and, therefore, a constant tension applied to tape 42.

Thus, movement of tension arm 166 takes up shock on tape 42 as it is withdrawn from reel 150. This reduces the stress on tape 42 and prevents it from tearing. With tensioning device 173 urging tension arm 166, a constant tension is applied to tape 42 as it is withdrawn. Movement of tension arm 166 also retracts tape 42 into tape reel subsystem 32 and takes up tape slack so that there is no excess tape in subsystem 32.

Figure 12:
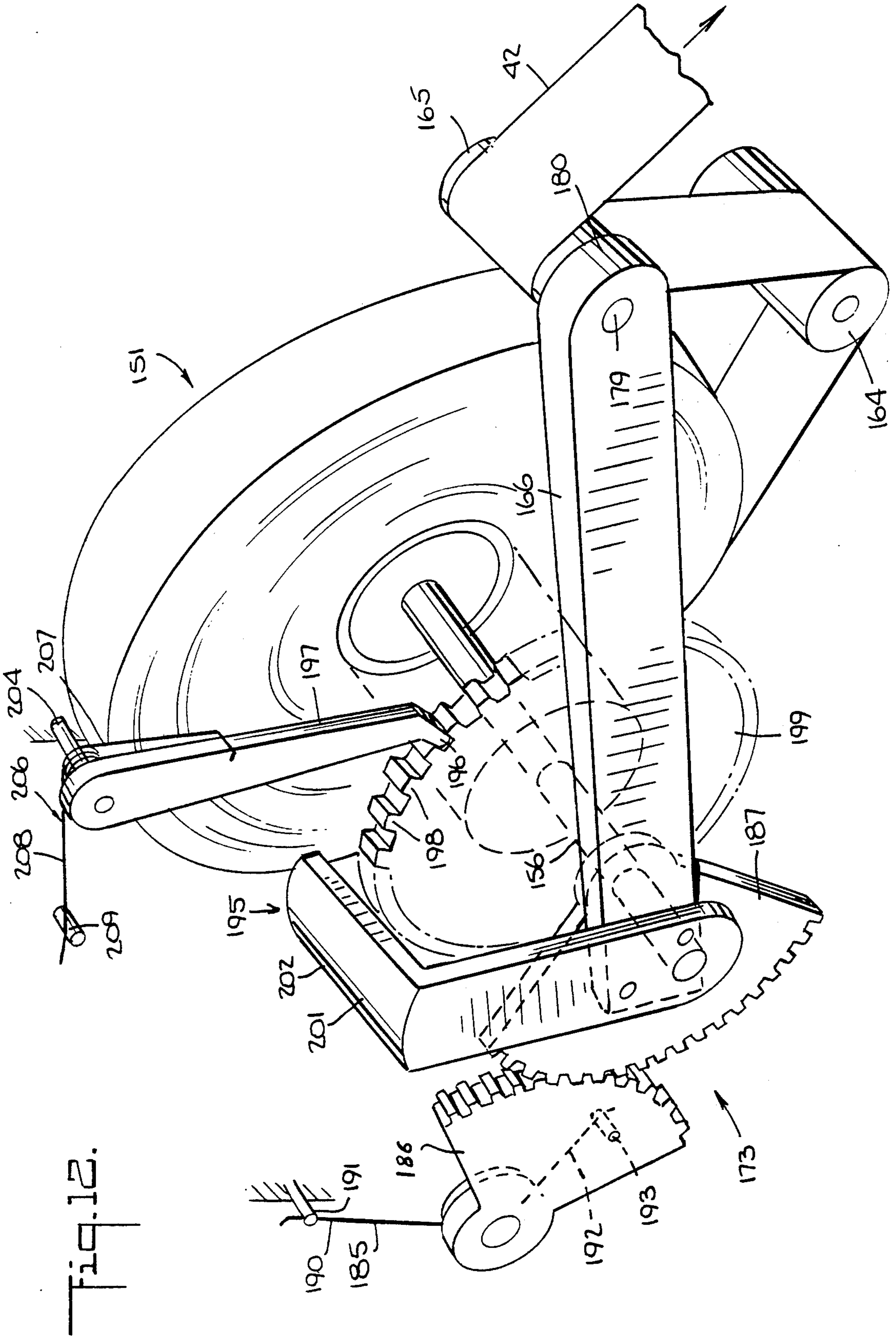
FIG. 12 is an exploded perspective view of the reel and locking mechanism depicted in FIGS. 10 and 11.
Figure 13:
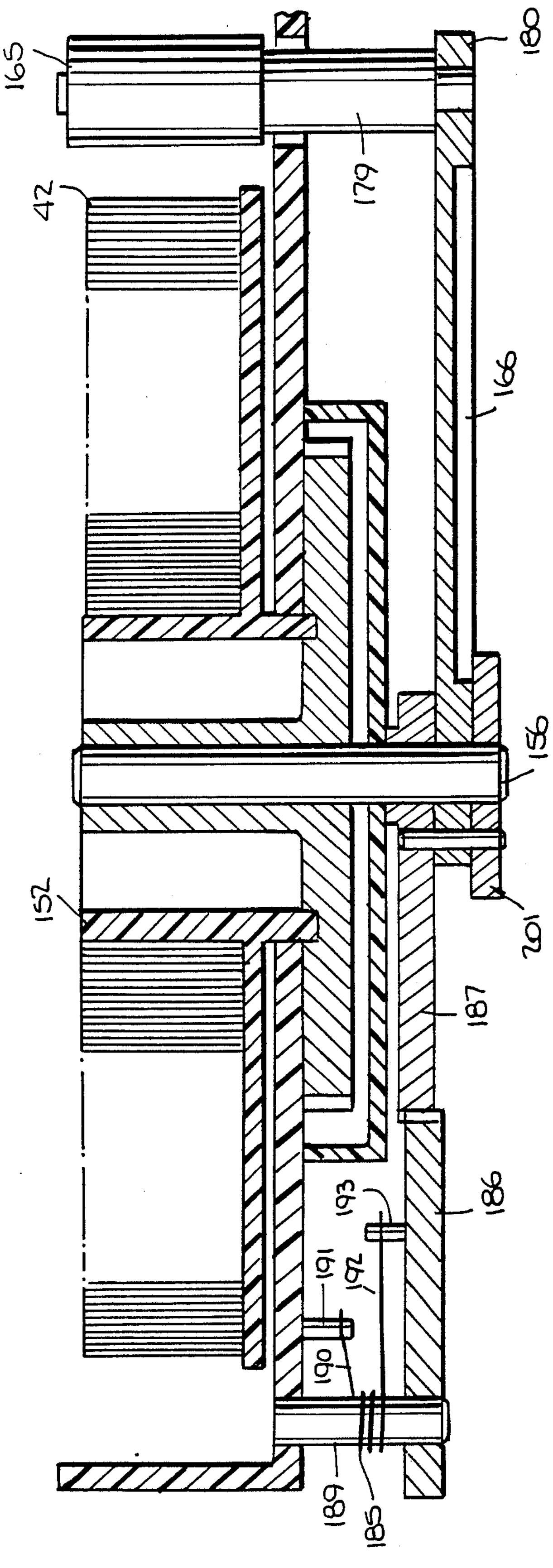
FIG. 13 is a sectional view of the reel and its locking mechanism taken along line 13—13 of FIG. 11.

Referring to FIG. 12, pawl and ratchet mechanism 195 locks reel 151 against rotation when end 196 of pawl 197 is engaged between cogs or teeth 198 of ratchet wheel 199. Ratchet wheel 199 is free to rotate on but engages reel 151 by means of three prongs of cylindrical cross section which mate with the tape roll bobbin so that ratchet wheel 199 turns as tape is being withdrawn from reel 151. Gear section 187 and tension arm 166 rotate freely relative to ratchet wheel 199. Pawl release arm 201 is fixed to tension arm 166 on spindle 156 and pivots with tension arm 166. Release arm 201 includes a flanged portion 202 which extends inwardly towards pawl 197 so as to engage pawl 197 as tension arm 166 is pivoted clockwise in FIG. 12. Pawl 197 is pivotally supported from frame 157 by pin 204 so that pawl end 196 may be moved into and out of engagement between teeth 198 of ratchet wheel 199. Torsion spring 206, also supported from pin 204, has one tang 207 engaging pawl 197 and its other tang 208 engaging pin 209 fixed to frame 157. Spring 206 therefore urges pawl 197 to pivot in a clockwise direction in FIG. 12 into engagement between teeth 198, and release arm 201 engages pawl 197 as release arm 201 is pivoted clockwise in FIG. 12 to disengage pawl 197 from ratchet wheel 199. The force of spring 206 is sufficient to maintain pawl 197 engaged in ratchet wheel 199 when a demand for tape is made by tape drive subsystem 30, which locks reel 151 against rotation until such time as pawl 197 is released by release arm 201. Pawl 197 also acts as a brake for reel 151 when end 196 is in contact with but not engaged by teeth 198.

Tape reel subsystem 32 operates as follows. Referring to FIG. 10, reel 151 is locked against rotation by pawl and ratchet mechanism 195 when there is no demand for tape. When a demand for tape is made by tape drive subsystem 30 and/or tape segment take-away subsystem 36, tension arm 166 is pivoted clockwise as tape 42 is withdrawn by tape drive subsystem 30. Continued advancement of tape 42 continues to pivot tension arm 166, with reel 151 locked and tape being withdrawn from tape reel subsystem 32 due solely to movement of roller 165 downwardly along the arc defined by slot 171. Initially, tension arm 166 pivots clockwise and reel 151 is locked to supply a length of tape corresponding to the maximum arc along which roller 165 moves before unlocking reel 151 i.e. "x" amount of tape is supplied before reel 151 is unlocked. When tension arm 166 has been pivoted to the position depicted in FIG. 11, pawl release arm 201 moves into contact with pawl 197. Further pivoting of tension arm 166 causes pawl release arm 201 to pivot pawl 197 and release pawl 197 from engagement with ratchet wheel 199, thereby unlocking reel 151 and permitting it to rotate. As demand for tape 42 continues, it is withdrawn from reel 151 and roller 165 "dances" along the arc of slot 171 as the tension created on tape 42 by tape drive subsystem 30 changes. The equilibrium tension on tape 42 is constant regardless of the pivoted position of tension arm 166 (with reel 150 unlocked) due to the linearity compensation provided to spring 185 by eccentric mounting of gear section 187, as described above.

It is preferred that the arc along which roller 165 "dances" when reel 151 is unlocked be about 30 degrees and be about 60 degrees when reel 151 is locked.

Figure 11:
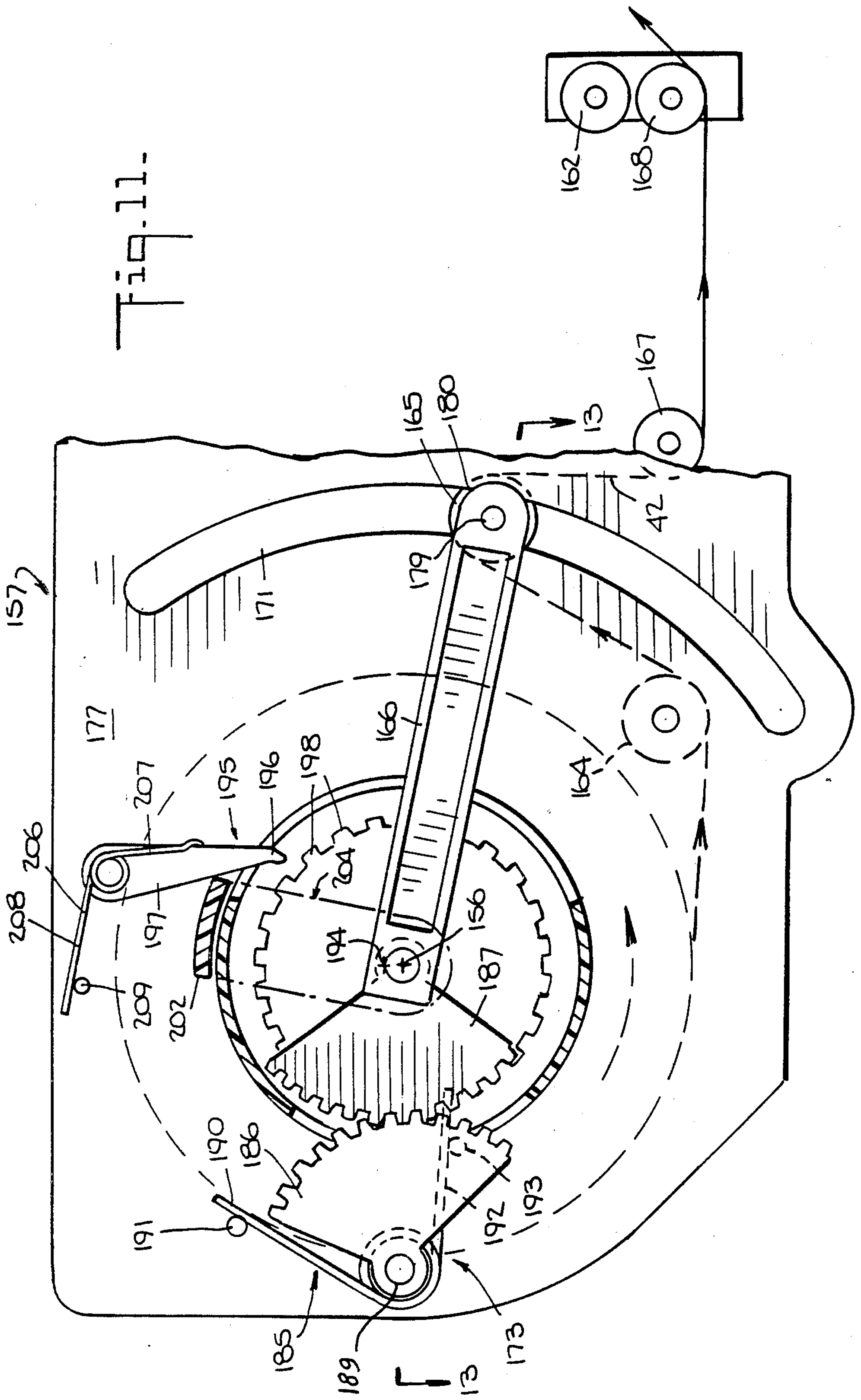
FIG. 11 is a side view similar to that of FIG. 10 showing the reel unlocked and free to rotate.

When demand for tape 42 by tape drive subsystem 30 and/or tape segment take-away subsystem 36 ceases, and with tension maintained on tape 42, reel 151 is stationary but unlocked as depicted in FIG. 11. Thus, tension arm 166 pivots t o take up tape slack. Tape drive subsystem 30 retracts tape 42 away from subsystem 36 along tape track 43, and tension arm 166 retracts tape 42 into subsystem 32 by pivoting counterclockwise under the action of spring 185 back to the position depicted in FIG. 10 where it locks reel 151 against rotation. Reel 151 is therefore not permitted to spin when there is no demand for tape, and the tension on tape 42 is maintained constant. Tension arm 166 may pivot further counterclockwise to the position depicted in FIG. 10, and in doing so retracts tape 42 a distance into tape reel subsystem 32 corresponding to the distance "x" between roller 165 and the upper end of slot 171. As discussed above, the printing matrix in postage meter module 24 may not imprint the exposed tape starting immediately at the edge of track 43. therefore the tape is retracted slightly after cutting so that the un-imprinted portion of the tape is not wasted. As mentioned, tape retraction performed by tape reel subsystem 32 is passive, i.e., the active element such as a motor or solenoid is not used, although active tape retraction may be used.

Figure 14:
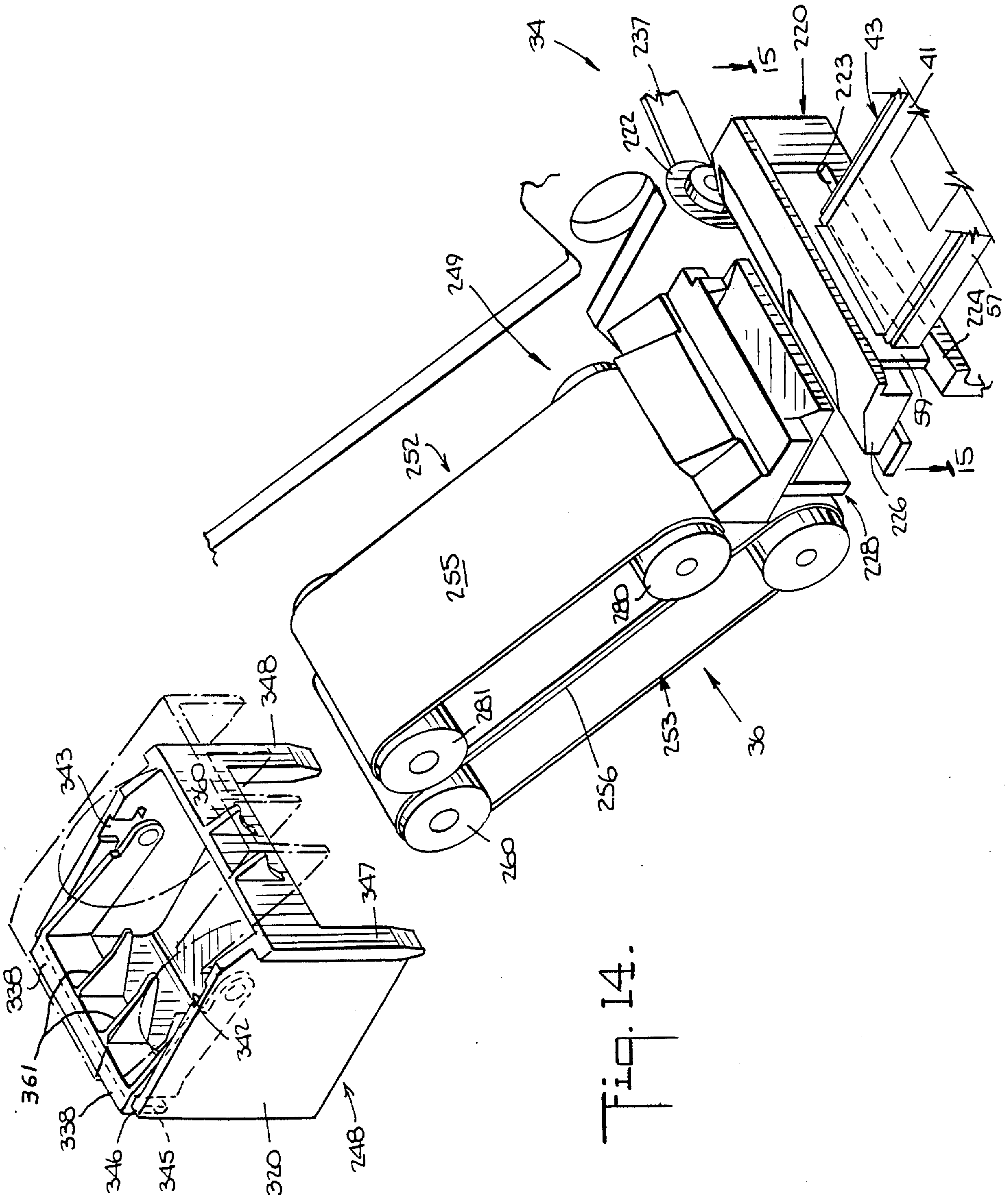
FIG. 14 is an exploded perspective view of the input conveyer and moistener device of the tape take-up and moistening system and part of the tape track of tape drive subsystem of the tape module of FIG. 1.
Figure 16:
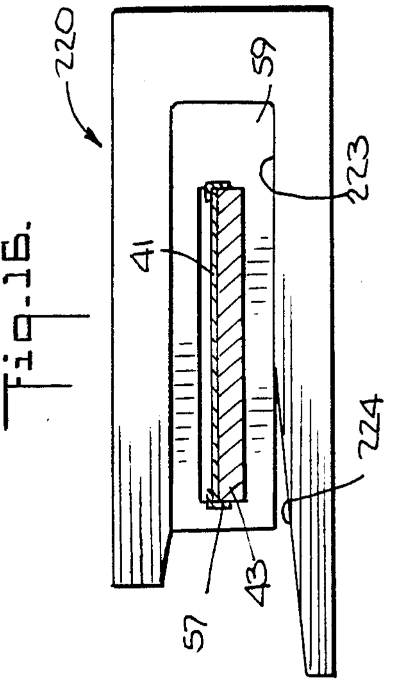
FIG. 16 is a sectional view of the tape track depicted in FIG. 15 taken along line 16—16 of FIG. 15.
Figure 15:
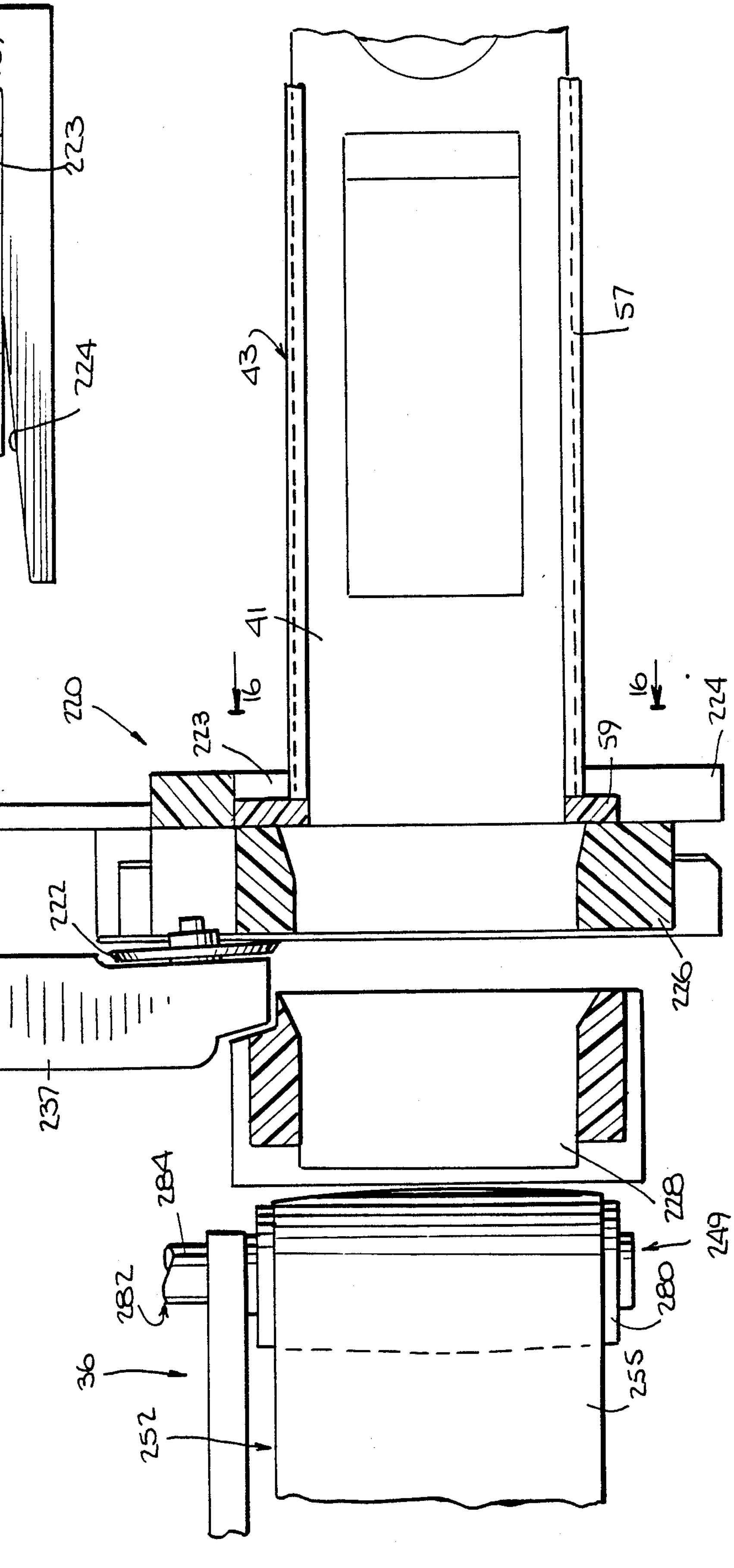
FIG. 15 is a top view part of the tape track and part of the input conveyer shown in FIG. 14.
Figure 17:
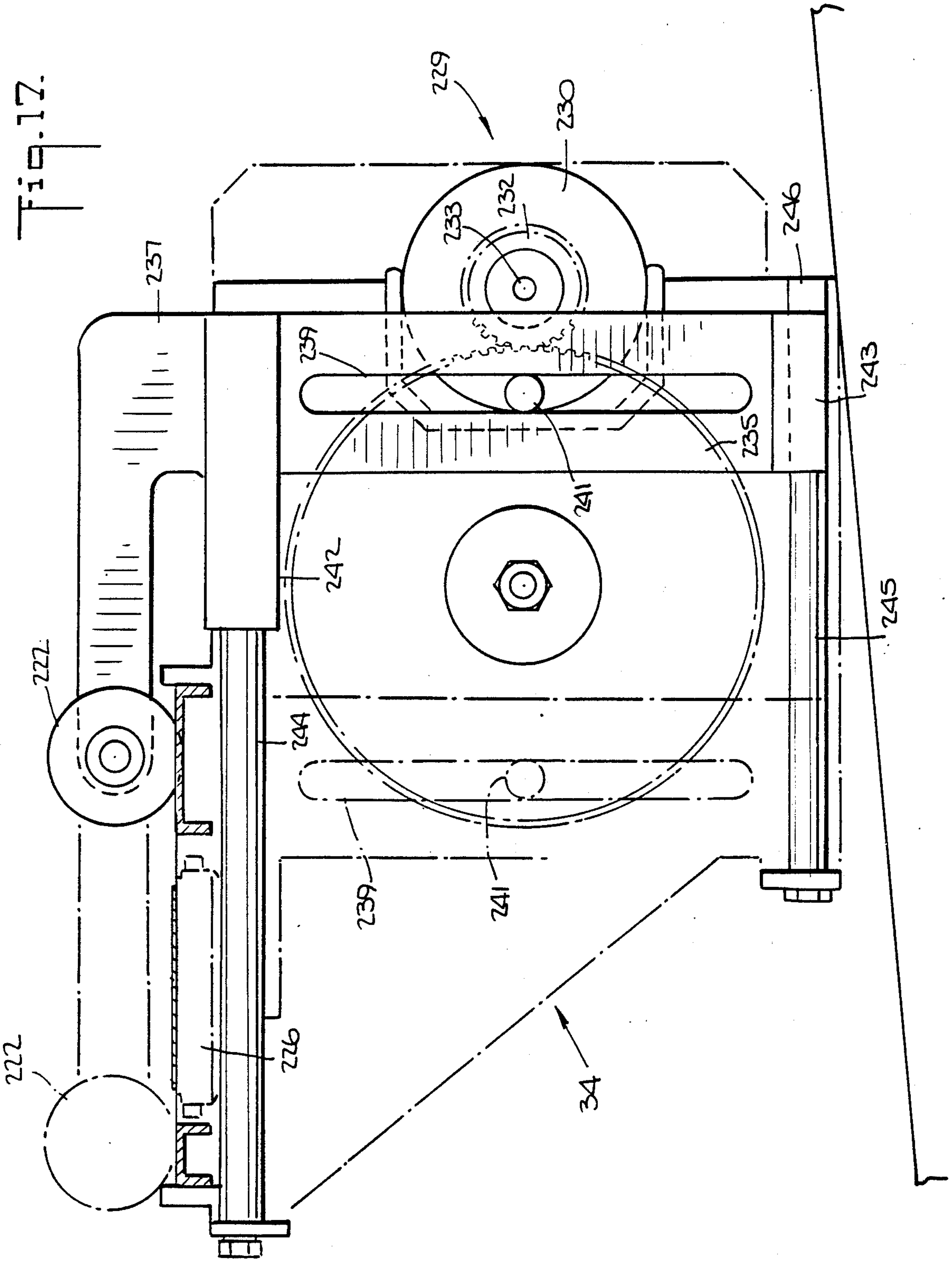
FIG. 17 is a side view partially in section of the tape cutter subsystem of the tape module of FIG. 1.

Referring to FIG. 14, after imprinting, tape 41 or 42 is advanced into tape take-away subsystem 36. When the imprinted portion of the tape passes the end 59 of track 43 and dock 220, tape is cut by cutting wheel 222 of tape cutting subsystem 34. In the home position of tape track 43 depicted in FIGS. 14, 15 and 16, end 59 is received in dock 220, and in the imprinting position, track 43 is moved out of dock 220 (to the left in FIG. 14) so it may be moved by platen 55 upwardly against the printing device in postage meter module 24. Dock 220 includes portion 223 which loosely receives tape track end 59 therein and aligns track 43 with output guide 226 of dock 220. To facilitate entry of tape track end 59 into dock portion 223, dock 220 also includes a larger portion 224 which is tapered to cam track end 59 into the smaller portion 223. Output guide 226 confines the tape to avoid buckling or displacement during a cutting operation and includes a straight, stationary blade which cooperates with cutting wheel 222 to cut the tape.

Tape output guide 226 of dock 220 is spaced from a tape input guide 228 of tape take-away subsystem 36 to allow cutting wheel 222 to traverse the tape and cut it. Cutting wheel 222 is reciprocated by tape cutting subsystem 34 between the solid and broken line positions depicted in FIG. 17. Drive system 229 for reciprocating cutting wheel 222 includes drive motor 230, gear 232 fixed to shaft 233 of motor 230, gear 235 supported for rotation meshed with gear 232, and bracket 237 which carries cutting wheel 222. Bracket 237 includes a vertical slot 239 and gear 235 has affixed thereto adjacent the periphery therefor a pin 241 which is disposed generally centered in slot 239 in the home position of cutting wheel 222 depicted in solid lines in FIG. 17. Bracket 237 includes hollow tubular portions 242, 243 which slidably receive rods 244, 245 fixed to the frame of 246 of tape module 25 to movably support bracket 237 and cutting wheel 222. Rotation of gear 235 in either direction causes pin 241 to ride in slot 239 and move bracket 237 to the left until bracket 237 reaches the broken-line position with pin 241 again generally centered in slot 239. Continued rotation of gear 235 in either direction causes pin 241 to again ride in slot 239 and return bracket 237 to its solid-line home position. Thus, rotation of shaft 233 in the same direction causes cutting wheel to traverse tape 41 to cut it and then return to the home position. Alternatively, the direction of rotation of shaft 233 may be reversed at either of the solid and broken-line positions depicted in FIG. 17 to reciprocate bracket 237. A shaft encoder (not shown) may be used to accurately determine when motor 230 has rotated shaft 233 to position cutting wheel 222 in its extreme reciprocated positions. The rotational axis of cutter wheel 220 in relationship to tape output guide 226 and stationary cutter blade is other than 90 degrees, for example 89 degrees, rather greater or less, namely a one degree cutter angle of attack.

Figure 18:
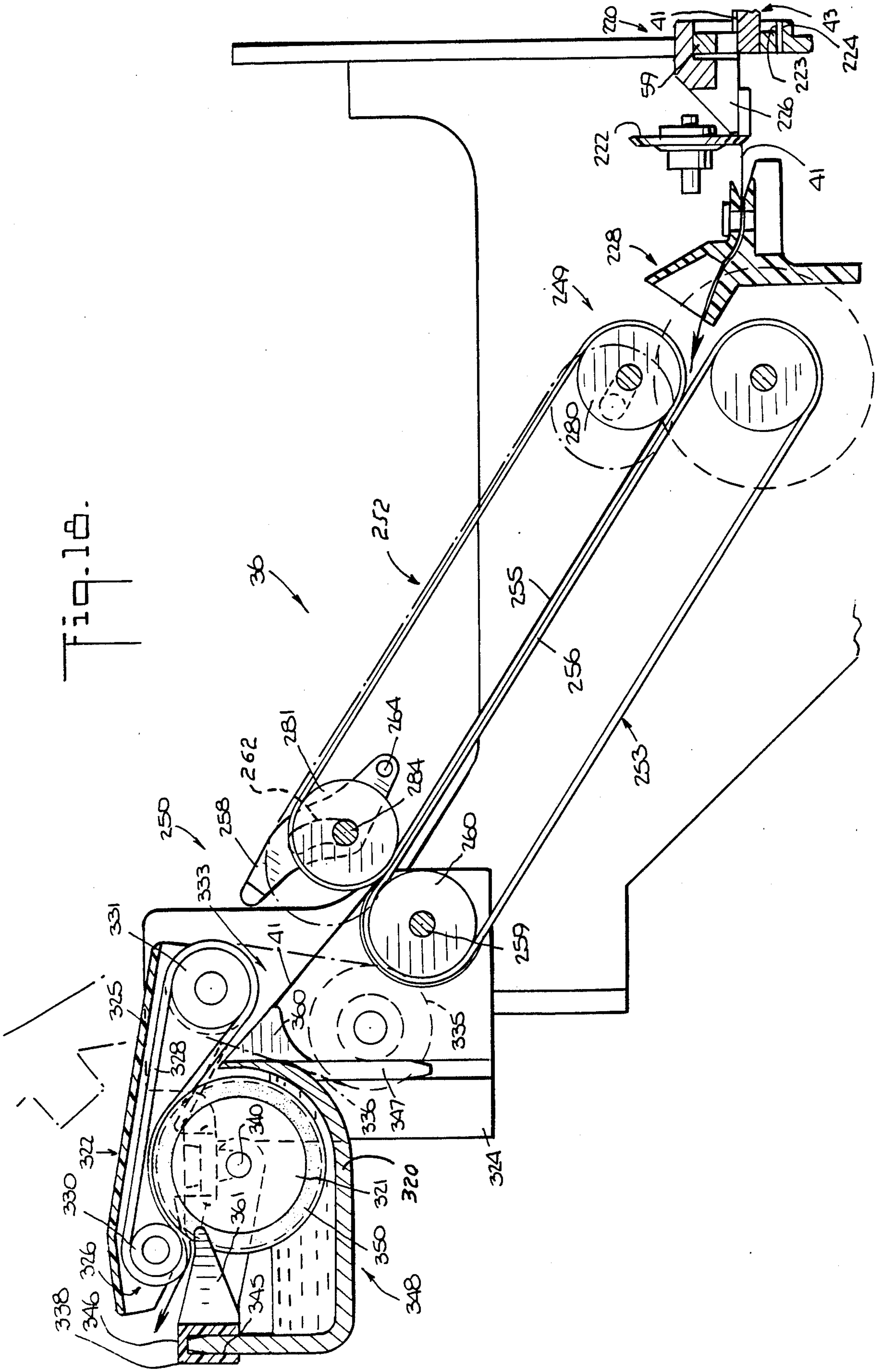
FIG. 18 is a side section view of the tape module take-off and moistening subsystem with a diverter finger thereof positioned to feed tape to the moistening device, also showing part of the tape track of the tape drive subsystem and the cutting wheel of the tape cutting subsystem of FIG. 1.

Referring to FIG. 18, tape take-away subsystem 36 includes a moistener device 248 through which tape 41 having a water activated glue is passed to activate the glue. A belt conveyer 249 advances tape 41 from tape input guide 228 towards moistener device 248. However, since tape module 25 handles tape 42 which does not include a water-activated glue, when tape 42 is advanced to tape take-away subsystem 36, tape 42 is caused to bypass moistener device 248. Bypassing is accomplished by diverter device 250 depicted in FIGS. 18–21.

Figure 19:
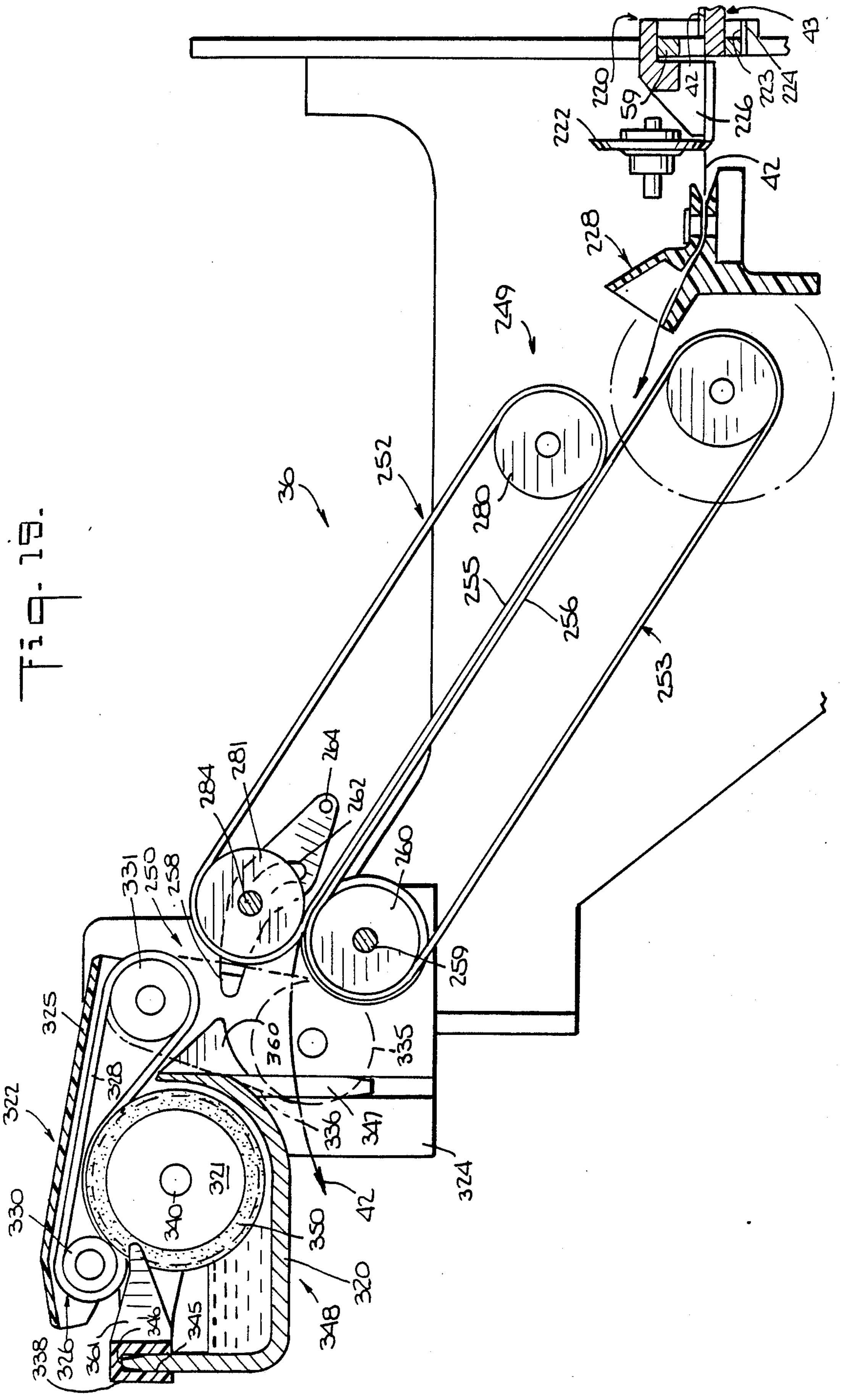
FIG. 19 is a view similar to FIG. 18 with the diverter finger positioned to feed tape to bypass the moistener device.

Belt conveyer 249 includes upper endless belt conveyer 252 and lower endless belt conveyer 253 having endless belts 255, 256, respectively, disposed in a facing relationship to engage and advance tape which is fed between the belts from tape input guide 228. Only one of upper conveyer 252 or lower conveyer 253 need be driven to advance tape between belts 255 and 256. In the embodiment described herein, lower belt 256 is driven. Referring to FIGS. 18 and 19, diverter device 250 includes a finger 258 which is movable between a first position depicted in FIG. 18 for directing tape to moistener device 248 and a second position depicted in FIG. 19 for causing tape to bypass moistener device 248. Upper endless belt conveyer 252 is movable relative to lower endless belt conveyer 253 between the solid and broken-line positions depicted in FIGS. 18 and 19. The position of upper endless conveyer 252 controls automatically the position of finger 258. Finger 258 is pivotally mounted to the shaft 264 of and includes a slot 262 which receives shaft 284. Finger 258 is pivotally mounted to the shaft 284 of roller 281 of upper conveyer 252. Longitudinal movement of roller 281 of upper conveyer 252 relative to lower conveyer 253 pivots finger 258 about shaft 264 to cause shaft 284 to ride in slot 262 of finger 258 and pivot finger Slot 262 is contoured in a partial U-shape to cause finger 258 to pivotally displace between the positions shown in FIGS. 18 and 19 when upper conveyer is moved between the positions depicted in FIGS. 19 and 20.

Figure 20:
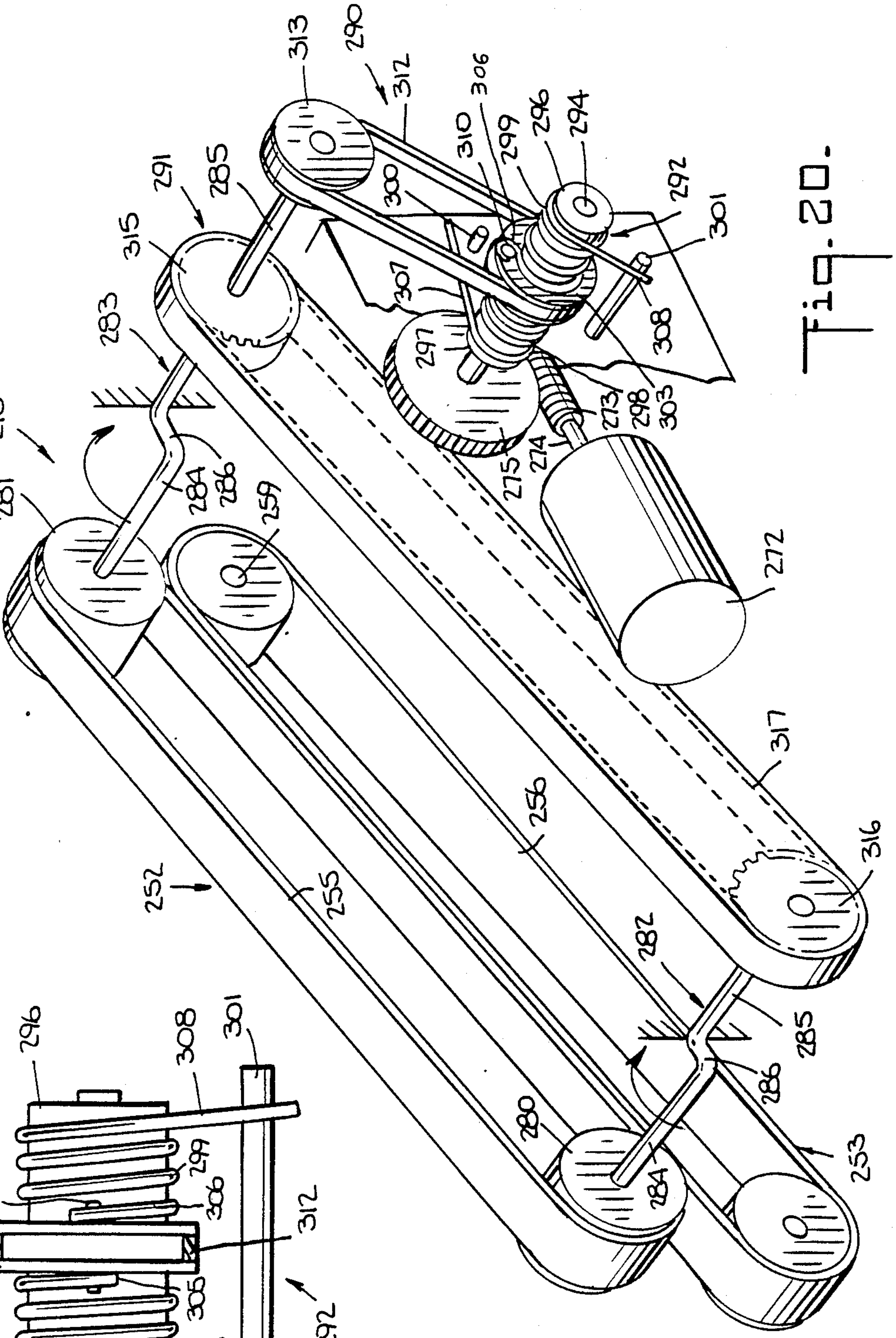
FIG. 20 is a perspective view of the drive portion of the tape take-up and moistening subsystem.
Figure 21:
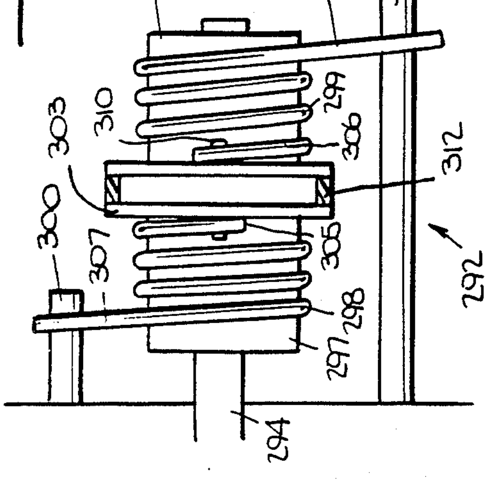
FIG. 21 is a perspective view the spring arrangement which controls the position of the diverter finger of the tape take-up and moistening subsystem.

Referring to FIGS. 20 and 21, mechanism 270 drives upper and lower conveyers 252 and 253 and longitudinally moves upper conveyer 252. A single drive motor 272 advances lower endless belt 256 (not shown) and longitudinally moves upper conveyer 252. Worm 273 is connected to shaft 274 of motor 272 to rotate therewith. Worm gear 275 is rotatably supported to mesh with worm 273 and to be rotated thereby. An appropriate transmission (not shown) couples shaft 274 of motor 272 to shaft 259 of roller 260 to rotate shaft 259 in the same direction regardless of the direction of rotation of motor shaft 274. Such a transmission may be conventional and will be known to one of skill in the art. A reversal in the direction of rotation of motor shaft 274 is used to longitudinally move upper conveyer 252.

Upper conveyer 252 is supported on rollers 280, 281 which are rotatably carried by respective crank shafts 282, 283. Crank shafts 282, 283 each include axial crank shaft portions 284, 285 connected by a radial crank shaft portion 286. Axial crank shaft portion 285 of crank shafts 282, 283 is journalled so that rotation of crank shafts 282, 283 causes axial crank shaft portion 284 to rotate in a circle having as it radius the length of crank shaft portion 286. therefore, rotation of axial crank shaft portion 285 by 180 degrees displaces crank shaft portion 284 by twice the length of crank shaft portion 286. That displacement moves rollers 280, 281 and endless belt 255 parallel to lower conveyer 253 by twice the length of crank shaft portion 286.

Crank shafts 282 and 283 are rotated by pulley systems 290, 291 and spring mechanism 292. Spring mechanism 292 is coupled to the shaft 294 of worm gear 275 and rotates, via pulley system 290, crank shaft 283 by 180 degrees each time the direction of motor 272 is reversed. Spring mechanism 292 includes hubs 296, 297, springs 298, 299, and pins 300, 301. Hubs 296 and 297 are secured on shaft 294 confining pulley 303 free to ride on shaft 294. Springs 298, 299 are identically spirally wound, and have identical inside diameters slightly less than the identical outside diameters of hubs 296, 297. Springs 298, 299 may be made of music wire, for example, having a diameter of 0.020 inches. Springs 298, 299 (FIG. 22) are each terminated at one end by a loop 305, 306, respectively, and at other ends by tangential tangs 307, 308. A rivet 310 passes through pulley 303 and secures springs 298, 299 to pulley 303. When tangs 307, 308 are unimpeded, springs 298, 299 rotationally capture pulley 303 so it is caused to rotate with shaft 294 as if it were keyed thereto. However, when shaft 294 rotates in either direction and one of the tangs is restrained, the associated spring is caused to unwrap and pulley 303 idles with no more frictional torque than presented by the unwound spring in contact with hubs 296, 297. Pins 300 and 301 are provided to engage tangs 307 and 308 and restrain the associated spring from rotating after the respective tang is engaged by the respective pin. By proper selection of the diameters of the shaft 294, the hubs 296, 297, the springs 298, 299 and the pulley 303, the frictional torque may be maintained at a sufficiently low level to allow pulley 303 to so idle.

With worm gear 275 rotating in a counterclockwise direction, tang 308 is engaged by pin 301 and spring 299 causes pulley 303 to idle. Upon reversing the direction of rotation of shaft 294 to clockwise, tang 307 rotates clockwise until it engages pin 300. During rotation of tang 307, spring 298 rotates clockwise and with it pulley 303. Rotation of pulley 303 is transmitted to crank shaft 283 by pulley system 290. Specifically, rotation of pulley 303 rotates, via belt 312, pulley 313 fixed to axial shaft portion 285 of crank shaft 283, thereby rotating crank shaft 283. Crank shaft 282 is rotated in unison with crank shaft 283 by pulley system 291, which includes pulley 315 fixed to crankshaft 283, pulley 316 fixed to crankshaft 282 and belt 317 coupling rotation of pulley 315 to pulley 316. Pulleys 303 and 313 are selected to rotate crank shaft 283 by 180 degrees over the rotation of shaft 294 required for a tang to engage a pin each time the direction of rotation of shaft 294 is reversed.

As discussed above, movement of roller 268 from the solid to the broken line positions shown in FIG. 18, causes finger 258 to pivot from the position depicted in FIG. 18 to the position depicted in FIG. 19. In the FIG. 18 position, finger 258 directs a water activated glue-backed tape 41 towards moistener device 248 and in the FIG. 19 position, finger 258 directs a pressure sensitive adhesive-backed tape 42 away from (below) moistener device 248.

Referring to FIGS. 14 and 18, 19 and 22–25, moistener device 248 supported adjacent belt conveyers 252 and 253 includes water reservoir 320, roller 321 and a tape guide 322. Frame 324 supports reservoir 320 and also pivotally supports a frame 325 to which belt conveyer 326 is mounted. Belt 328 of conveyer 326 is supported by rollers 330, 331 against moistener device roller 321, and driven by roller 331 to rotate clockwise as seen in FIG. 18. Roller 331 of belt conveyer 326 is driven from motor 272 (FIG. 20) by means of an appropriate transmission (not shown) and pulley 335 and belt 336 which cause roller 331 to rotate clockwise regardless of the direction of rotation of motor 272. Such a transmission may be conventional and will be known to one of skill in the art. Tape guide 322 includes an input portion 333 which receives tape from finger 258 (when positioned as depicted in FIG. 18) and directs it between belt 328 and roller 321. Belt 328 is tensioned by its engagement with moistener roller 321 and not only advances tape past roller 321 to moisten the glue on the tape to activate it, but also rotates roller 321 counterclockwise which assists in tape advancement and at the same time moistens roller 321 as it rotates in reservoir 320.

Figure 24:
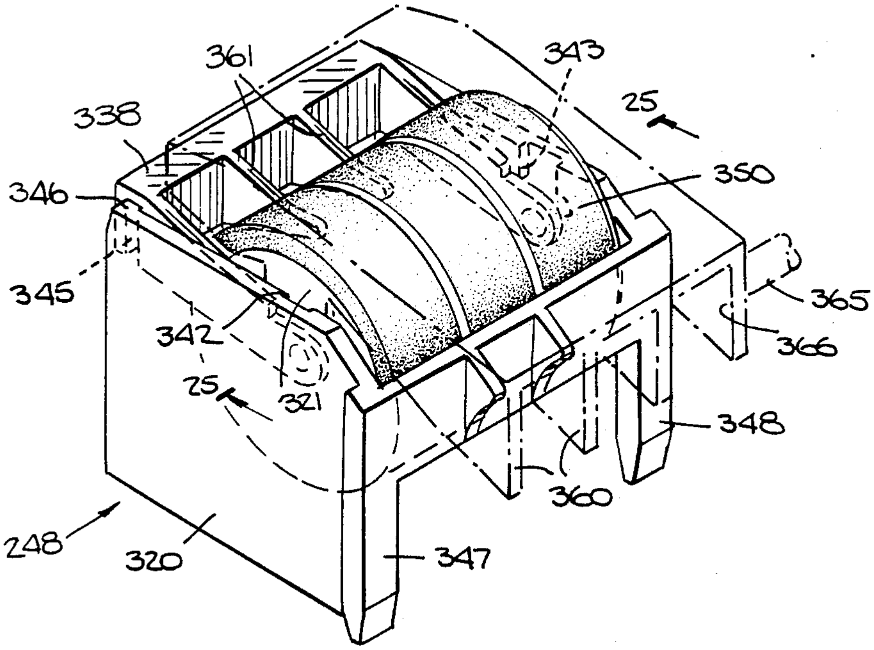
FIG. 24 is a top perspective view of the moistener device.
Figure 25:
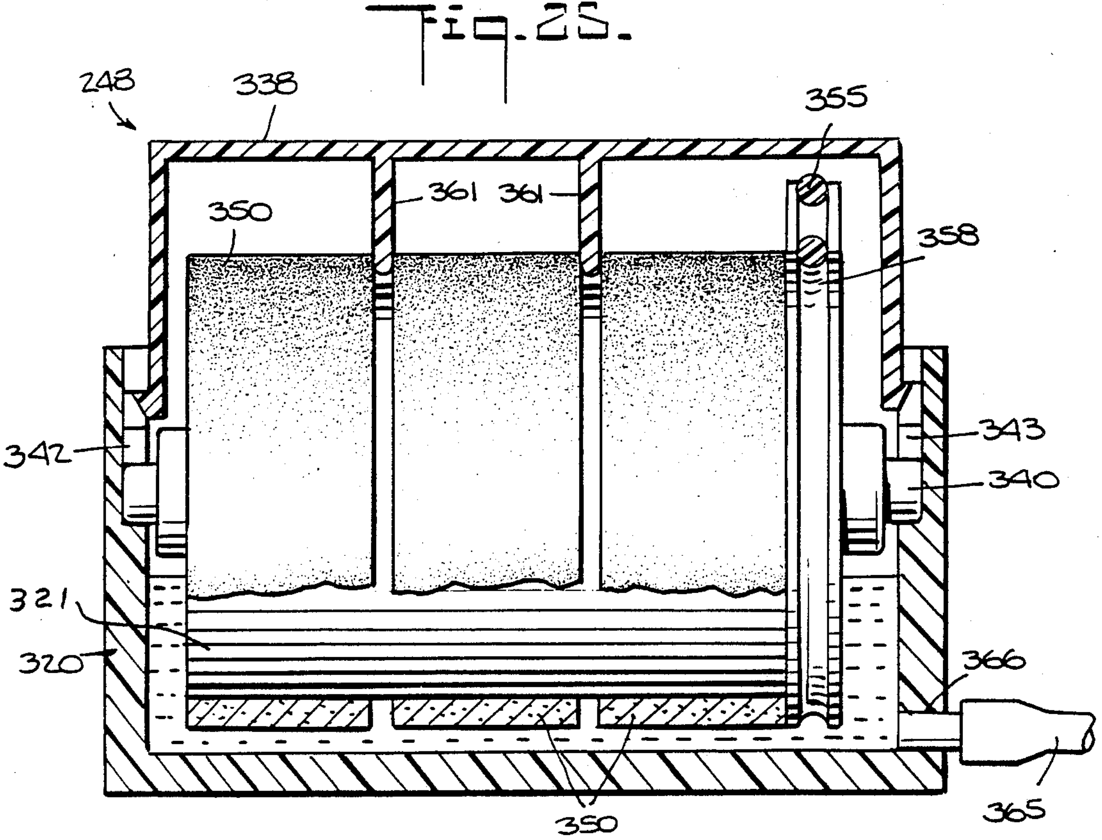
FIG. 25 is a section view of the moistener device of 24 taken along line 25—25 of 24.

Referring to FIG. 22 frame 325 supporting belt conveyer 328 is, as mentioned, pivotally mounted to provide access to reservoir 320, to, for example, facilitate replacement of roller 321, and servicing of the moistener device. Referring to FIGS. 23–25, roller 321 is removably mounted to reservoir 320 by a snap fit arrangement for ease of assembly and disassembly. Roller 321 is rotatably supported in frame 338 on shaft 340. Shaft 340 extends at each end from frame 338 and is received in snap-in fashion in slots 342, 343 of reservoir 320 such that roller 321 resides deeply within reservoir 320 and in contact even with small amounts of water therein. Frame 338 includes a slot 345 sized to receive in snap-in fashion the top, rear edge 346 of reservoir 320 therein. Reservoir 320 includes a pair of spaced prongs 347 and 348 which are received in snap-fit fashion in frame 324 (FIG. 18) to support reservoir 320.

Roller 321 is covered by a layer of sorbent material 350 with which tape advanced past roller 321 is contacted to wet the glue on the tape. A resilient, sorbent material such as felt is preferred as a covering material 350 for roller 321 so that the material is wetted by capillary action when roller 321 is not being rotated. In that way, the material is always wet, even after periods of inactivity when the material 350 is not rotated through the water in reservoir 320. That prevents a build-up of minerals on the surface of the sorbent material which may otherwise happen if the sorbent material is allowed to dry, and also insures that the moistener device is always ready to perform its wetting function. Belt 328 of conveyer 326 is tensioned to force tape 41 against the resilient material 350 to compress it and thereby insure that the entire surface of the tape comes into contact with the material and is wetted without dry spots. Other types of rollers, for example a comb roller, may be used to wet tape 41.

O-ring 355 (FIG. 25) received in groove 358 at the sides of roller 321. Reservoir 320 includes projections 360 attached to the exterior of reservoir 320 to guide tape towards roller 321 and prevent tape from passing below reservoir 320, and projections 361 extending into grooves in roller 321 to guide tape from roller 321 and prevent it from advancing into the reservoir below the roller.

Reservoir 320 is replenished with water via tube 365 (FIG. 25) and corrected to an inlet 366 to reservoir 320.

Initialization and overall operation of tape module 25 is as follows. Tapes 41 and 42 are fed via respective rollers to the respective tape drive rollers in tape advancing means 46. A tape, for example tape 41, is selected for advancement by means of a command entered, for example, by keyboard into an electrical control system controlling, for example, a mailing machine including tape module 25, postage meter 24 and platen module 26 or a larger mailing machine. Another command is entered if the tape is to be wetted. Motor 60 causes first coupling means 53 to couple motor 40 to drive roller 48 and motor 60 is actuated to advance a predetermined length of tape into track 43. The process is repeated for the other tape, in this case tape 42. Another command entered, for example, by a keyboard entry, activates the mailing machine to print indicia on a selected tape. Motor 60 then moves track 43 forward into its printing position, platen 55 is raised to impact the selected tape against the printing device in postage meter 24, then lowered to its rest position, and track 43 is moved back to its home position. Motor 40 is again actuated and motor 272 of tape take-away system is actuated to advance a predetermined length of the imprinted tape into tape take-away subsystem 36. Motor 230 of tape cutting subsystem 229 is then actuated to cause cutting wheel 222 to sever a segment of imprinted tape. The unsevered portion of the tape is then retracted by tape reel supply subsystem 32 in preparation for a next imprinting on the same tape. Motor 272 of tape takeaway subsystem 32 is again activated to advance the severed portion of the tape towards moistener device 248. If a command was previously entered to wet the severed tape, finger 258 is in the raised position of FIG. 18 to guide tape to moistener device 248, and roller 331 is driven by motor 272 to advance tape over wetting roller 321 to the exit of tape module 25. The printing device in postage meter 24 may then be inked, if necessary, prior to the next imprinting of tape. The above cycle is then repeated as long as a command is not entered to imprint the other tape, or not to imprint tape at all.

When a command is entered to imprint a different tape, motor 60 is reversed to retract the tape then being imprinted. Motor 60 is then reversed to cause motor 40 to be coupled to the drive roller for the other tape and activated long enough to return carriage 44 back to its home position. Motor 40 is then reversed again to advance a predetermine length of the new tape into track 43. If the new tape is not to be wetted, another command is entered which moves conveyer 252 closer to moistener device 248 causing finger 258 to pivot downwardly to the position depicted in FIG. 19. Tape imprinting, cutting and withdrawal towards the exit of tape module 25 proceed as described above, except that the tape is not fed to moistener device 248.

The control system described in application Ser. No. 291,483 referenced above, may be used to accomplish and synchronize the foregoing.

Certain changes and modifications of the embodiments of the invention herein disclosed will be readily apparent to those of skill in the art. Moreover, uses of the invention other than in mailing apparatus will also be readily apparent to those of skill in the art. It is the applicants, intention to cover by the claims all such uses and all those changes and modifications which could be made to the embodiments of the invention herein chosen for the purposes of disclosure which do not depart from the spirit and scope of the invention.

We claim:

1. A dual tape drive system comprising:

a first drive motor;

a first roller adapted to receive a first tape and advance said first tape upon rotation of said first roller;

a second roller adapted to receive a second tape and advance said second tape upon rotation of said second roller;

means coupling said first drive motor to selectively rotate said first and second rollers;

control means for adjusting said coupling means to drive either said first roller or said second roller; and a guiding structure receiving said first tape advanced by said first roller and second second tape advanced by said second roller and guiding said first and second tapes into a parallel, facing and contacting relationship with each other.

2. The tape drive system of claim 1 including a tape track having a generally planar tape track surface and means for guiding tape therealong, said tape track being disposed to receive said first and said second tapes from said guiding structure, said tape track guiding said first and second tapes along said planar surface in said parallel, facing and contacting relationship.

3. The tape drive system of claim 2 including a first frame supporting said first and second rollers, said guiding structure and said tape track.

4. The tape drive system of claim 3 including first means mounting said first frame to a second frame for movement in two orthogonal direction relative to said second frame.

5. The tape drive system of claim 4 wherein said first mounting means comprises a parallelogram linkage connecting said first and second frames and enabling relative movement between said first and second frames in one of said orthogonal directions.

6. The tape drive system of claim 4 including second means mounting said first drive motor in said second frame, said first drive motor having a drive shaft, said coupling means comprising a split shaft coupling which couples first and second parts of said drive shaft so that said second drive shaft part may be moved axially parallel to one of said orthogonal directions relative to said first shaft part, said first and said second drive rollers being movable with said second shaft part, enabling relative movement between said first and second frames along said one orthogonal direction.

7. The tape drive system of claim 5 including second means mounting said first drive motor in said second frame, said first drive motor having a drive shaft, said coupling means comprising a split shaft coupling which couples first and second parts of said drive shaft so that said second drive shaft part may be moved axially parallel to the of said orthogonal directions relative to said first shaft part, said first and said second drive rollers being movable with said second shaft part, enabling relative movement between said first and second frames along said other orthogonal direction.

8. The tape drive system of claim 4 including a second drive motor mounted in said second frame for moving said first frame.

9. The tape drive system of claim 8 wherein said second drive motor is bidirectional and has a drive shaft which said second motor rotates in opposite directions, said control means being coupled to said second drive motor shaft and causing said coupling means to change coupling of said first drive motor from one drive roller to the other when said second drive motor changes the direction of rotation of its drive shaft.

10. A dual tape drive system comprising:

a first frame;

a second frame;

first means mounting said first frame to said second frame for movement in two orthogonal directions relative to said second frame.

a first drive motor mounted to said first frame;

a first roller mounted in said second frame adapted to receive a first tape and advance said first tape upon rotation of said first roller;

a second roller mounted in said second frame adapted to receive a second tape and advance said second tape upon rotation of said second roller;

means mounted in said first frame coupling said first drive motor to selectively rotate said first and second rollers;

control means for adjusting said coupling means to drive either said first roller or said second roller;

a second drive motor mounted in said first frame;

second means coupled said second motor to said second frame for moving said second frame in a first of said orthogonal directions.

11. The tape drive system of claim 10 including guiding structure receiving said first tape advanced by said first roller and said second tape advanced by said second roller and guiding said first and second tapes into a parallel, facing and contacting relationship with other.

12. The tape drive system of claim 11 including a tape track having a generally planar tape track surface and means for guiding tape therealong, said tape track being disposed to receive said first and said second tapes from said guiding structure, said tape track guiding said first and second tapes along said planar surface in said parallel, facing and contacting relationship.

13. The tape drive system of claim 10 wherein said first mounting means comprises a parallelogram linkage connecting said first and second frames and enabling relative movement between said first and second frames in a second of said orthogonal directions.

14. The tape drive system of claim 13, wherein said first drive motor has a drive shaft, said coupling means comprising a split shaft coupling which couples first and second parts of said drive shaft so that said second drive shaft part may be moved axially parallel to said first orthogonal direction relative to said first shaft part, said first and said second drive rollers being movable with said second shaft part, enabling relative movement between said first and second frames along said one orthogonal direction.

15. The tape drive system of claim 14 wherein said second drive motor is bidirectional and has a drive shaft which said second motor rotates in opposite directions, said control means being coupled to said second drive motor shaft and causing said coupling means to change coupling of said first drive motor from one drive roller to the other when said second drive motor changes the direction of rotation of its drive shaft.

16. The tape drive system of claim 14 wherein said second coupling means includes a lead screw having a bidirectional screw thread having first and second ends, said lead screw being coupled to said second drive motor drive shaft to rotate therewith, and a lead screw follower coupled to said bidirectional lead screw to advance along said lead screw thread in one direction from said first thread end to said second thread end upon rotation of said lead screw in either direction and then along said lead screw in a direction opposite to said one direction from said second thread end to said first thread end upon further rotation cf said lead screw in either direction, said lead screw follower being coupled to said second frame and advancing said second frame therewith relative to said lead screw.

17. The tape drive system of claim 16 wherein said second drive motor is bidirectional and rotates said drive shaft in opposite directions, said control means being coupled to said second drive motor shaft and causing said coupling means to change coupling of said first drive motor from one drive roller to the other when said second drive motor changes the direction of rotation of its drive shaft.

18. The tape drive system of claim 16 wherein said lead screw follower includes an axially split collar.

19. In a postage meter including a printing device, a dual tape drive system for selectively advancing first and second tapes for imprinting by said printing device, said dual tape drive system comprising:

a first frame;

a second frame;

first means mounting said first frame to said second frame for movement in two orthogonal directions relative to said second frame and said printing device;

a first drive motor mounted to said first frame for advancing said first and said second tapes by said printing device;

means mounted in said first frame coupling said first drive motor to selectively advance said first and second tapes;

control means for adjusting said coupling means to advance either said first tape or said second tape;

means guiding said first and said second tapes in a parallel, facing relationship by said printing device;

a second drive motor mounted in said first frame;

second means coupling said second motor to said second frame for moving said second frame in a first of said orthogonal directions to a printing position with said tapes adjacent said printing device;

means moving said second frame in a second of said orthogonal directions to move an exposed one of said tapes closer to said printing device for imprinting thereon by said printing device.

20. A tape module for supplying a plurality of tapes to a work station and removing the tape therefrom, said tape module comprising:

(a) a tape reel system including:

means for holding at least first and second tape reels;

first and second tapes wound on said first and second tape reels, respectively;

means for tensioning said first and second tapes as they are respectively withdrawn from said first and second tape reels;

(b) a tape advancing system comprising:

first means receiving said first and said second tapes from said tape reel system, guiding said first and second tapes from said first means in a parallel facing relationship to and within a first location, and selectively advancing one of said tapes at a time in said first location;

second means for causing said first means to select said one tape for advancing in said one location;

(c) means for severing a segment from said one tape in or adjacent said first location;

(d) a tape segment advancing system including:

means for receiving a cut segment of tape from said first location and selectively advancing said segment in first and second directions depending on a condition of said tape segment.

* * * * *